United States Patent
Salkintzis

(10) Patent No.: US 12,010,562 B2
(45) Date of Patent: Jun. 11, 2024

(54) PDU SESSION FOR ENCRYPTED TRAFFIC DETECTION

(71) Applicant: Lenovo (Singapore) PTE. LTD., New Tech Park (SG)

(72) Inventor: Apostolis Salkintzis, Athens (GR)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/045,381

(22) PCT Filed: Apr. 3, 2018

(86) PCT No.: PCT/EP2018/058419
§ 371 (c)(1),
(2) Date: Nov. 5, 2020

(87) PCT Pub. No.: WO2019/192672
PCT Pub. Date: Oct. 10, 2019

(65) Prior Publication Data
US 2021/0168665 A1    Jun. 3, 2021

(51) Int. Cl.
*H04W 36/00* (2009.01)
*H04L 9/40* (2022.01)
(Continued)

(52) U.S. Cl.
CPC ..... *H04W 36/0011* (2013.01); *H04L 63/0485* (2013.01); *H04L 63/168* (2013.01); *H04W 76/12* (2018.02); *H04W 80/10* (2013.01)

(58) Field of Classification Search
CPC ............ H04L 63/0428; H04L 63/0485; H04L 63/168; H04L 63/30; H04W 12/02; H04W 36/0011; H04W 76/12; H04W 80/10
See application file for complete search history.

(56) References Cited

U.S. PATENT DOCUMENTS 11,521,136 B2 * 12/2022 Ince ................. G06Q 10/025
2017/0364794 A1 * 12/2017 Mahkonen .......... H04L 63/0428
(Continued)

OTHER PUBLICATIONS

PCT/EP2018/058419, "Notification of Transmittal of the International Search Report and the Written Opinion of the International Searching Authority, or the Declaration", PCT ISA, dated Nov. 29, 2018, pp. 1-17.
(Continued)

*Primary Examiner* — Liton Miah
(74) *Attorney, Agent, or Firm* — Kunzler Bean & Adamson

(57) ABSTRACT

Apparatuses, methods, and systems are disclosed for PDU Session Establishment for encrypted traffic detection. One apparatus includes a transceiver and a processor The processor transmits a request to establish a PDU session with a mobile communication network. Moreover, the processor receives a PDU session establishment response from the mobile communication network. Here, the response includes a list of one or more application identifiers for which detection information is to be provided. Accordingly, the processor calculates detection information for each application identifier. The processor modifies a data packet from first application associated with the start of an encrypted data flow to include the detection information of the first application. Additionally, the processor controls the transceiver to transmit the modified data packet to the mobile communication network.

20 Claims, 14 Drawing Sheets

(51) Int. Cl.
*H04L 29/06* (2006.01)
*H04W 76/12* (2018.01)
*H04W 80/10* (2009.01)

(56) References Cited

U.S. PATENT DOCUMENTS

2018/0139223 A1* 5/2018 Yan .................... G06F 21/552
2022/0078226 A1* 3/2022 Sabella ................. G06F 9/505

OTHER PUBLICATIONS

3GPP, "3rd Generation Partnership Project; Technical Specification Group Services and System Aspects; Procedures for the 5G System; Stage 2 (Release 15)", 3GPP TS 23.502 V15.1.0, Mar. 2018, pp. 1-285.
3GPP, "3rd Generation Partnership Project; Technical Specification Group Services and System Aspects; Study on encrypted traffic detection and verification (Release 16)", 3GPP TR 23.787 V0.2.0, Mar. 2018, pp. 1-16.
3Gpp, "3rd Generation Partnership Project; Technical Specification Group Services and System Aspects; System Architecture for the 5G System; Stage 2 (Release 15)", 3GPP TS 23.501 V15.1.0, Mar. 2018, pp. 1-201.
Motorola Mobility, Lenovo, "UE-based Solution for Encrypted Traffic Detection", SA WG2 Meeting #126 S2-182482, Feb. 26-Mar. 2, 2018, pp. 1-6.

* cited by examiner

PDU SESSION FOR ENCRYPTED TRAFFIC DETECTION

FIELD

The subject matter disclosed herein relates generally to wireless communications and more particularly relates to PDU Session Establishment for encrypted traffic detection.

BACKGROUND

The following abbreviations and acronyms are herewith defined, at least some of which are referred to within the following description.

Third Generation Partnership Project ("3GPP"), Access and Mobility Management Function ("AMF"), Access Point Name ("APN"), Access Stratum ("AS"), Carrier Aggregation ("CA"), Clear Channel Assessment ("CCA"), Control Channel Element ("CCE"), Channel State Information ("CSI"), Common Search Space ("CSS"), Data Network Name ("DNN"), Data Radio Bearer ("DRB"), Downlink Control Information ("DCI"), Downlink ("DL"), Enhanced Clear Channel Assessment ("eCCA"), Enhanced Mobile Broadband ("eMBB"), Evolved Node-B ("eNB"), Evolved Packet Core ("EPC"), Evolved UMTS Terrestrial Radio Access Network ("E-UTRAN"), European Telecommunications Standards Institute ("ETSI"), Frame Based Equipment ("FBE"), Frequency Division Duplex ("FDD"), Frequency Division Multiple Access ("FDMA"), Globally Unique Temporary UE Identity ("GUTI"), Hybrid Automatic Repeat Request ("HARQ"), Home Subscriber Server ("HSS"), Internet-of-Things ("IoT"), Key Performance Indicators ("KPI"), Licensed Assisted Access ("LAA"), Load Based Equipment ("LBE"), Listen-Before-Talk ("LBT"), Long Term Evolution ("LTE"), LTE Advanced ("LTE-A"), Medium Access Control ("MAC"), Multiple Access ("MA"), Modulation Coding Scheme ("MCS"), Machine Type Communication ("MTC"), Massive MTC ("mMTC"), Mobility Management ("MM"), Mobility Management Entity ("MME"), Multiple Input Multiple Output ("MIMO"), Multipath TCP ("MPTCP"), Multi User Shared Access ("MUSA"), Non-Access Stratum ("NAS"), Narrowband ("NB"), Network Function ("NF"), Next Generation (e.g., 5G) Node-B ("gNB"), Next Generation Radio Access Network ("NG-RAN"), New Radio ("NR"), Policy Control & Charging ("PCC"), Policy Control Function ("PCF"), Policy Control and Charging Rules Function ("PCRF"), Packet Data Network ("PDN"), Packet Data Unit ("PDU"), PDN Gateway ("PGW"), Quality of Service ("QoS"), Quadrature Phase Shift Keying ("QPSK"), Radio Access Network ("RAN"), Radio Access Technology ("RAT"), Radio Resource Control ("RRC"), Receive ("RX"), Switching/Splitting Function ("SSF"), Scheduling Request ("SR"), Serving Gateway ("SGW"), Session Management Function ("SMF"), System Information Block ("SIB"), Transport Block ("TB"), Transport Block Size ("TBS"), Time-Division Duplex ("TDD"), Time Division Multiplex ("TDM"), Transmission and Reception Point ("TRP"), Transmit ("TX"), Uplink Control Information ("UCI"), Unified Data Management ("UDM"), User Entity/Equipment (Mobile Terminal) ("UE"), Uplink ("UL"), User Plane ("UP"), Universal Mobile Telecommunications System ("UMTS"), Ultra-reliability and Low-latency Communications ("URLLC"), and Worldwide Interoperability for Microwave Access ("WiMAX").

In wireless communication systems, most of the traffic generated by mobile devices today is encrypted end-to-end, i.e., between mobile device (UE) and the remote server. This enables communication privacy and protects sensitive information from being captured by malicious third parties.

However, the end-to-end encryption of traffic prevents mobile network operators from accurately detecting the type of traffic exchanged between mobile devices and remote servers and, thus, makes it difficult to apply service-specific policies to such traffic. For example, a network operator may need to charge differently the video streaming traffic exchanged with a specific remote server. If the network operator cannot accurately detect which traffic is video streaming traffic exchanged the specific remote server, this charging policy cannot be applied.

In an attempt to overcome this problem, mobile network operators have deployed deep-packet-inspection equipment which attempt to determine the service associated with each encrypted flow by analyzing the pattern of the flow and leveraging header information that is not encrypted. However, such detection means have been proven unreliable and can detect only a limited range of services or applications. Moreover, with the wider application of more powerful end-to-end security protocols (such as TLS 1.3) the detection of encrypted traffic with deep packet inspection has become even more difficult.

BRIEF SUMMARY

Methods for PDU Session Establishment for encrypted traffic detection are disclosed. Apparatuses and systems also perform the functions of the methods. One method (e.g., of a user equipment) for PDU Session Establishment for encrypted traffic detection includes transmitting a request to establish a PDU session between a remote unit (e.g., a UE) and a mobile communication network. The method includes receiving a PDU session establishment response from the mobile communication network. Here, the response includes a list of one or more application identifiers for which the remote unit (e.g., UE) is to provide encrypted traffic detection information when an application having an application identifier in the list sends encrypted traffic over the established PDU session. The method includes calculating encrypted traffic detection information for each application identifier in the list. The method also includes modifying a data packet associated with a start of encrypted traffic flow of a first application in the list to include encrypted traffic detection information and transmitting the modified data packet from the remote unit to the mobile communication network.

One method of a network function for PDU Session Establishment for encrypted traffic detection includes receiving a request from a first network function to generate encrypted traffic detection information for a list of one or more application identifiers. Here, the request is in response to a remote unit (e.g., a UE) requesting to establish a PDU session with the mobile communication network. The method includes receiving a signature for the remote unit and calculating encrypted traffic detection information for each application identifier in the list using the signature. The method also includes transmitting the list of one or more application identifiers and corresponding encrypted traffic detection information for each application identifier in the list to the first network function.

Another method of a network function for PDU Session Establishment for encrypted traffic detection includes receiving a policy request from the first network function. Here the policy request includes data indicating that a remote unit (e.g., a UE) can provide encrypted traffic detection information, where the policy request is sent in response to the remote unit requested to establish a PDU session with the mobile communication network. The method includes generating a list of one or more application identifiers of applications for which the remote unit is to provide encryption traffic detection information, e.g., when sending encrypted traffic on the established PDU session. The method includes transmitting, to a second network function, a request to generate encrypted traffic detection information for the list of application identifiers and receiving, from the second network function, encryption traffic detection information for each application identifier in the list. The method includes transmitting a policy response to the first network function, the policy response including the list of one or more application identifiers and the encrypted traffic detection information corresponding to the list.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
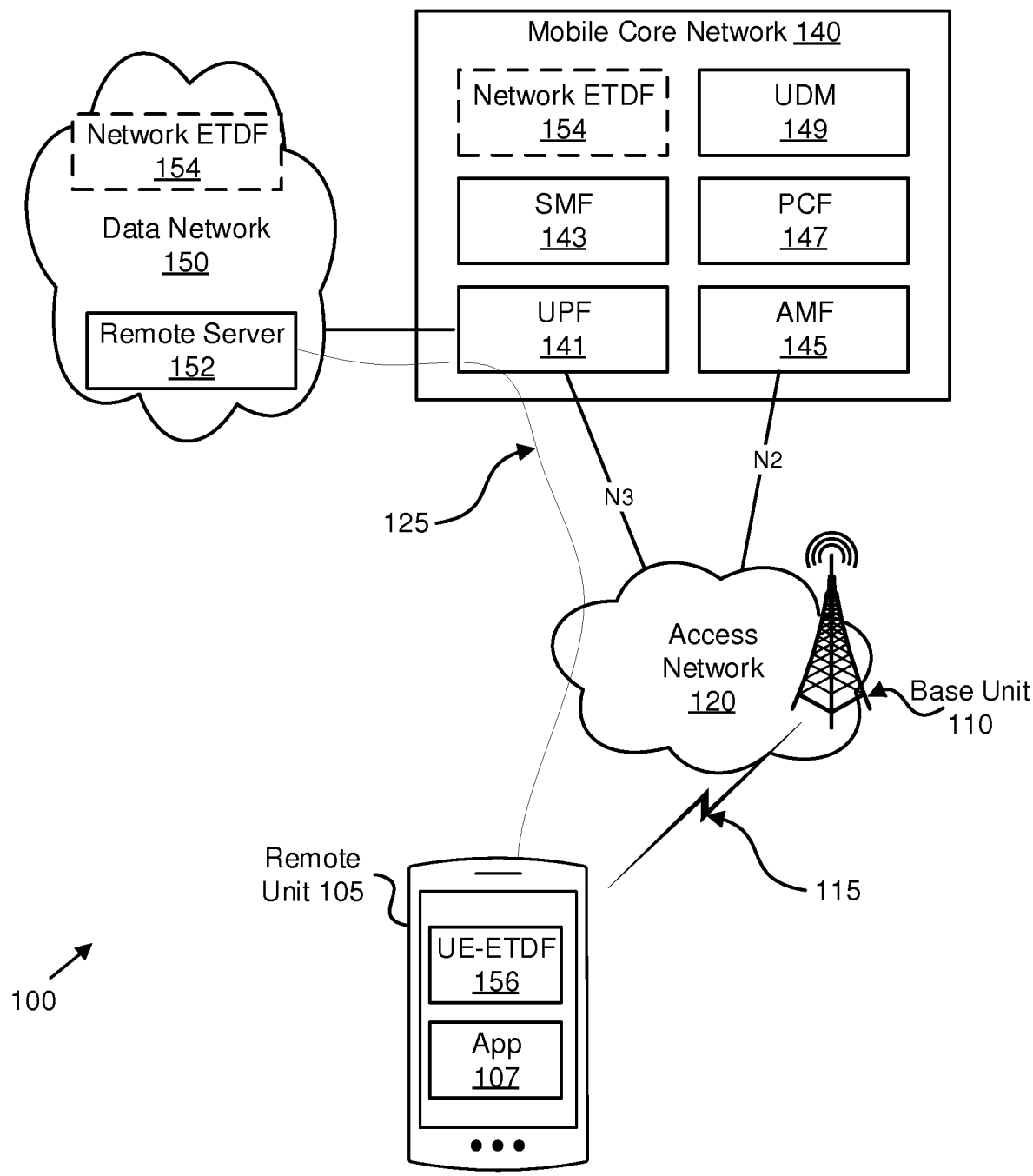
FIG. 1 is a schematic block diagram illustrating one embodiment of a wireless communication system for PDU Session Establishment for encrypted traffic detection.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

FIG. 1 depicts a wireless communication system 100 for PDU Session Establishment for encrypted traffic detection, according to embodiments of the disclosure. In one embodiment, the wireless communication system 100 includes at least one remote unit 105, an access network 120 containing at least one base unit 110, wireless communication links 115, and a mobile core network 140. Even though a specific number of remote units 105, access networks 120, base units 110, wireless communication links 115, and mobile core networks 140 are depicted in FIG. 1, one of skill in the art will recognize that any number of remote units 105, access networks 120, base units 110, wireless communication links 115, and mobile core networks 140 may be included in the wireless communication system 100. In another embodiment, the access network 120 contains one or more WLAN (e.g., Wi-Fi™) access points.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the wireless communication links 115.

In some embodiments, the remote units 105 may communicate with a remote server 152 via a data path 125 that passes through the mobile core network 140 and a data network 150. For example, a remote unit 105 may establish a PDU connection (or a data connection) to the data network 150 via the mobile core network 140 and the access network 120. The mobile core network 140 then relays traffic between the remote unit 105 and the remote server 152 using the PDU connection to the data network 150.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the access network 120, that may include one or more controllers communicably coupled to one or more corresponding base units 110. These and other elements of the radio access network are not illustrated, but are well known generally by those having ordinary skill in the art. The base units 110 connect to the mobile core network 140 via the access network 120.

The base units 110 may serve a number of remote units 105 within a serving area, for example, a cell or a cell sector via a wireless communication link 115. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a data network 150, like the Internet and private data networks, among other data networks. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple control plane functions including, but not limited to, an Access and Mobility Management Function ("AMF") 145, a Session Management Function ("SMF") 143, and a Policy Control Function ("PCF") 147. Additionally, the mobile core network 140 includes a user plane function ("UPF") 141 and a Unified Data Management ("UDM") 149. Although specific numbers and types of network functions are depicted in FIG. 1, one of skill in the art will recognize that any number and type of network functions may be included in the mobile core network 140.

To detect the start of an encrypted data flow and associate the encrypted traffic with an application, the wireless communication system 100 includes a network encrypted traffic detection function ("NW-ETDF") 154. Each remote unit 105 has a user equipment encrypted traffic detection function ("UE-ETDF") 156 which detects when a new encrypted data flow is initiated, e.g., by application 107, and inserts detection information in at least the first user-plane packet of this data flow. The NW-ETDF 154 verifies the authenticity of a UE-ETDF 156 in the remote unit 105 based on a signature of the UE-ETDF 156, as discussed in further detail below. This authenticity verification is very important because the network must trust that the UE-ETDF 156 is providing the right "encrypted traffic detection information." In some scenarios, a malicious remote unit 105 may attempt to provide fake detection information, e.g., it may fraudulently indicate that an encrypted data flow is originated by App-X although the data flow is really originated by App-Y.

In various embodiments, the UE-ETDF 156 in every remote unit 105 has a unique signature which can be calculated only by the UE-ETDF 156 itself and the NW-ETDF 154. As used here, a "unique" signature refers to the signature of one UE-ETDF 156 being different from the signature of all other UE-ETDF instances. The signature confirms the integrity of the UE-ETDF 156. Here, the signature is calculated such that other entities (except UE-ETDF 156 and NW-ETDF 154) cannot spoof the signature of a UE-ETDF 156 because they do not know the algorithm used for this calculation. In some embodiments, the signature calculated by using a hash function or one-way function.

In one embodiment, an UE-ETDF 156 is pre-configured in every remote unit 105 in the wireless communication system 100. In another embodiment, the UE-ETDF 156 is downloaded to the remote unit 105 from NW-ETDF 154. In both cases, the NW-ETDF 154 knows the signature of the UE-ETDF 156 in every remote unit 105.

During PDU session establishment, the network (e.g. the PCF 147) determines the applications for which encrypted data flows are to be detected. A list of these applications (e.g., a list of application identifiers) is sent to the remote unit 105, which then provides "detection information" for each encrypted data flow initiated by these applications. This list of applications may be pre-configured by the operator in the NW-ETDF 154. In one embodiment, the list of applications is the same for all remote units 105. In another embodiment, the list of applications is specific to a remote unit 105.

One example of detection information is an "AppKey," which is a value that indicates the application which initiated the encrypted data flow. For each application identifier sent to remote unit 105, the remote unit 105 calculates detection information (e.g., an AppKey) by using the signature of its UE-ETDF 156. Similarly, the network calculates an AppKey for each application provided to the remote unit 105 by using the same UE-ETDF 156 signature stored in the NW-ETDF 154. The AppKey, or other detection information, is used by the UPF 141 to determine the application associated with an encrypted data flow.

In various embodiments, the NW-ETDF 154 provides to the PCF 147 a list of applications and the AppKey corresponding to each application. Here, the list may be a list of one or more application identifiers of applications for which the UE is to provide encrypted traffic detection information when sending encrypted traffic over the established PDU session. This list is then transferred to an anchor UPF 141 (via SMF 143) and is used by UPF 141 to determine the application associated to an encrypted data flow. After that, the UPF 141 may apply the installed PCC rule(s) for this application.

Moreover, if the UE-ETDF 156 in the remote unit 105 is modified in any way (e.g. by a malicious user), then the UE-ETDF 156 signature will change and will not match the UE-ETDF 156 signature stored in the NW-ETDF 154. Therefore, the AppKeys calculated by the modified UE-ETDF 156 will be different from the AppKeys calculated by the NW-ETDF 154. In response to the network receiving an unknown AppKey from a remote unit 105, it determines that the UE-ETDF 156 in this remote unit 105 is invalid (e.g. modified by an unauthorized user) and may take appropriate actions. For example, the network may block all encrypted traffic of the untrusted remote units 105.

As used here, a PDU session refers to a network connection in the wireless communication system 100 established by the remote unit 105. A PDU session is a logical connection between the remote unit 105 and a data network, such as the data network 150. A remote unit 105 may have multiple PDU sessions at a time. Each PDU session is distinguishable by a unique combination of Data Network Name ("DNN"), Session and Service Continuity ("SSC")

mode, and/or network slice identifier (e.g., S-NSSAI). In various embodiments, each PDU session is associated with a different IP address.

The NW-ETDF 154 may communicate with the remote unit 105 by using either the control plane (i.e. NAS transport) or by using the user plane (i.e. IP transport). In the depicted embodiment, the NW-ETDF 154 is located in the data network 150. Here, the NW-ETDF 154 may communicate with the remote unit 105 over the user plane. However, in other embodiments the NW-ETDF 154 is located in the mobile core network 140. For example, the NW-ETDF 154 may be co-located with the PCF 147. When a part of the mobile core network 140, the NW-ETDF 154 may communicate with the remote unit 105 over the control plane.

The remote unit 105 implements ETDF to detect encrypted flows initiated by applications executing on the remote unit 105. When the UE-ETDF 156 detects that the application 107 initiates an encrypted flow, the remote unit 105 modifies at least a first packet of the detected encrypted flow (e.g., a TCP SYN) by adding the "encrypted traffic detection information" associated with the application 107 and sending the modified data packet to the network (e.g., to an anchor UPF 141).

The UPF 141 anchor in the mobile core network 140 receives the packet with the "encrypted traffic detection information" and associates this packet and all subsequent packet of the same data flow with the application 107. Then, the UPF 141 may apply the PCC rule(s) associated with the application 107. In certain embodiments, the remote unit 105 piggybacks the AppKey (or other detection information) onto the first 2-3 packets, instead of the first packet only, to account for transmission errors.

Figure 2A:
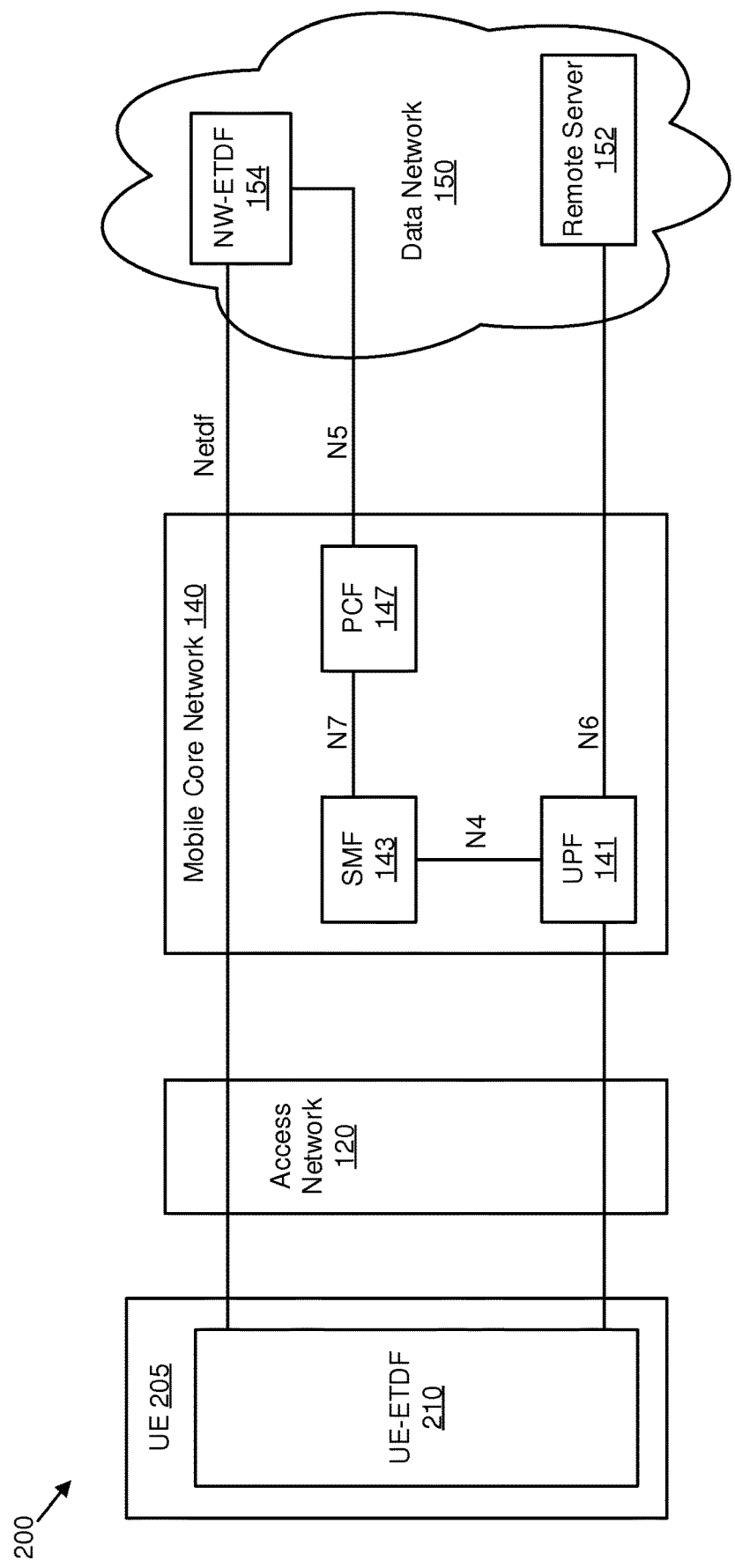
FIG. 2A is a block diagram illustrating one embodiment of a network architecture for PDU Session Establishment for encrypted traffic detection.

FIG. 2A depicts a network architecture 200 used for PDU Session Establishment for encrypted traffic detection, according to embodiments of the disclosure. The network architecture 200 may be a simplified embodiment of the wireless communication system 100. As depicted, the network architecture 200 includes a UE 205 that communicates with the mobile core network 140 via the access network 120. Via the mobile core network 140, the UE 205 establishes a PDU session to connect with the remote server 152 in the data network 150. The UE 205 also has a connection to the NW-ETDF 154, depicted here are being located in the data network 150. The UE 205 may be one embodiment of the remote unit 105 described above.

As depicted, there is an Encrypted Traffic Detection Function in the UE (e.g., UE-ETDF 210) and an Encrypted Traffic Detection Function in the data network 150 (e.g., NW-ETDF 154). Here, the UE-ETDF 210 is a UE functional component that can be either pre-installed in the UE 205 or can be retrieved from the NW-ETDF 154 and installed in the UE 205, as discussed herein. The UE-ETDF 210 can communicate with the NW-ETDF 154 by using either the control plane (i.e., NAS transport) or by using the user plane (i.e., IP transport). In various embodiments, the UE-ETDF 210 and the NW-ETDF 154 communicate over a new interface "Netdf."

In an alternative embodiment, the NW-ETDF 154 may reside in the mobile core network 140. The exact location of the NW-ETDF 154 may depend on whether the communication between the UE-ETDF 210 and the NW-ETDF 154 takes place over the control plane (the NW-ETDF 154 resides in the mobile core network 140 in such cases), or whether it takes place over the user plane (the NW-ETDF 154 resides in a data network 150 in such cases).

Upon request, the NW-ETDF 154 provides to UE 205 the UE-ETDF 210 over a secure connection (e.g. over a TLS connection). The NW-ETDF 154 provides the UE 205 a unique instance of the UE-ETDF 210, such that every UE-ETDF has a unique "signature." For every UE-ETDF instance delivered to a UE, the NW-ETDF 154 stores the signature of the UE-ETDF instance and the device identity of the UE.

Additionally, the NW-ETDF 154 calculates the application key of each application provided by the PCF. As discussed herein, the UE-ETDF signature is used to calculate encrypted traffic detection information and allows the NW-ETDF 154 to verify the authenticity of the UE-ETDF 210. Application key calculation is discussed in greater detail below, with reference to FIGS. 7 and 9. The application keys together with their associated application identities are forwarded to the UPF 141 and are used in the UPF 141 for identifying the application that initiated an encrypted data flow.

The UE-ETDF 210 detects when a new encrypted data flow is initiated in the UE (e.g. by detecting TCP SYN packets to port '443') and determines the UE application that initiated the encrypted data flow. In various embodiments, the UE-ETDF 210 piggybacks an application key (e.g., the "AppKey" discussed above) in the first packet of an encrypted data flow. The application key is then used by the UPF 141 to determine the application that initiated the encrypted data flow. The application key is essentially "encrypted traffic detection information" that is provided by the UE 205 to the mobile core network 140 and assists the network in associating an encrypted data flow with a certain application. As discussed in further detail below, the application key is an efficient form of encrypted traffic detection information provided by the UE 205 to the mobile core network 140.

Figure 2B:
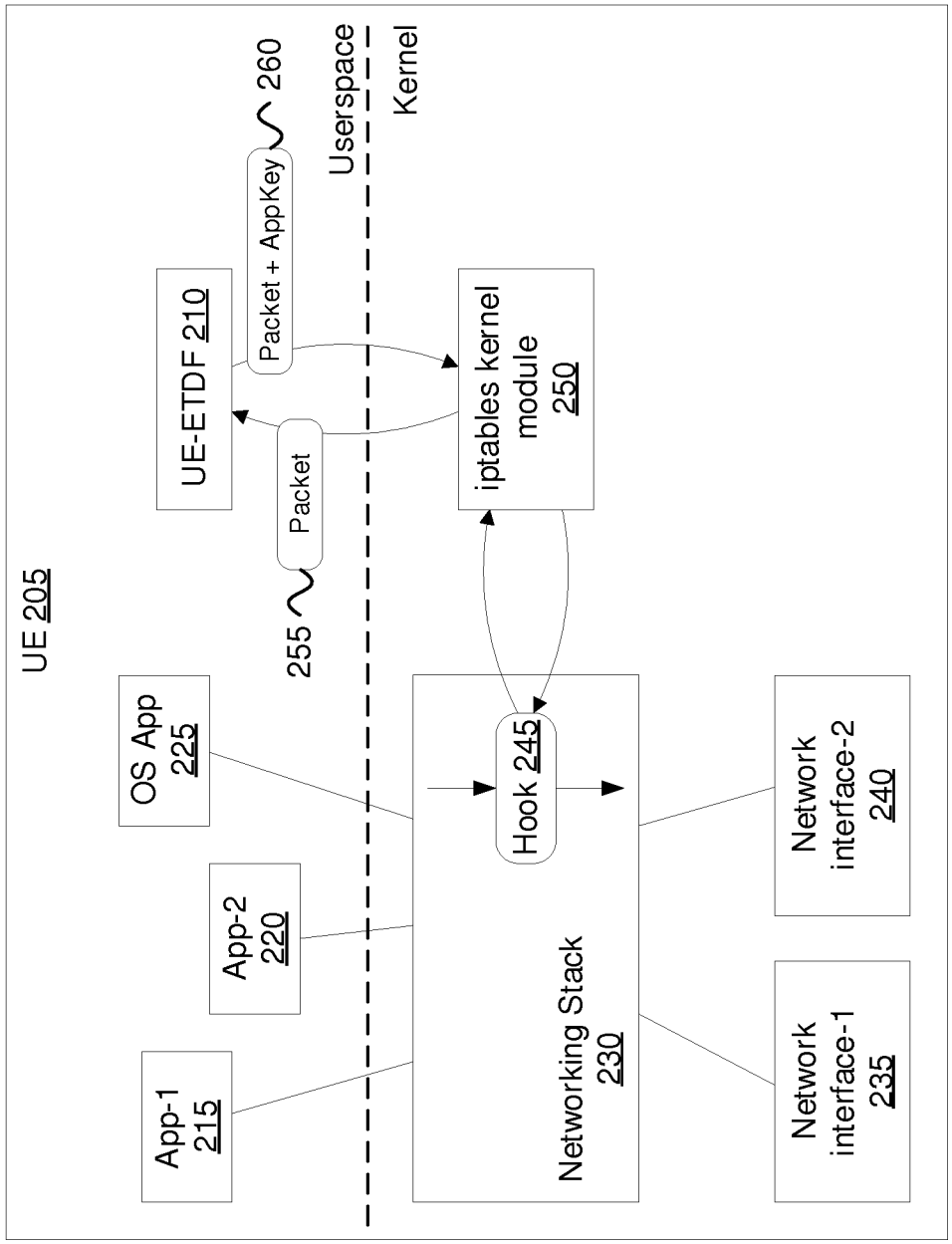
FIG. 2B is a block diagram illustrating one embodiment of an encrypted traffic detection function in a user equipment.

The UE-ETDF 210 must be able to intercept the user-plane traffic in the UE 205 in order to detect when a new encrypted data flow is initiated. In an example implementation, the UE-ETDF 210 may be inserted into the packet processing flow of the UE 205, as shown in FIG. 2B. This type of implementation utilizes the "hooks" implemented in various points in the UE networking stack 230 (e.g., Linux Netfilter hooks). However, other alternative implementations are within the scope of the disclosure.

FIG. 2B depicts a UE-ETDF 210 in the UE 205, according to embodiments of the disclosure. Here, the UE-ETDF 210 is a part of the UE networking stack 230 of the UE 205. As such, the UE-ETDF 210 has access to the user-plane traffic in the UE 205, including data packets generates by the applications running on the UE 205. As depicted, the UE 205 includes a first user application ("App-1") 215, a second user application ("App-2") 220, and an operating system application ("OS App") 225, each capable of initiating an encrypted data flow. As will be understood, the UE 205 may run more or fewer applications, however only three are shown. The UE 205 also includes a first network interface ("Network interface-1") 235 and a second network interface ("Network interface-2") 240 through which the user-plane traffic may pass.

In the depicted embodiment, the UE-ETDF 210 utilizes the "hooks" 245 implemented in various points in the UE networking stack 230. Each hook 245 is essentially a point in the packet processing flow which can call kernel modules registered to "listen" to this hook. Once the packet processing flow within the networking stack reaches a hook 245, the kernel modules registered to listen to this hook are called one by one in priority order.

Additionally, the iptables kernel module 250 (e.g., based on the "iptables" kernel module in Linux) is configured to pass the packet to a userspace component, here the UE-ETDF 210, for further processing, logging, and manipulation. This way the UE-ETDF 210 has access to all outbound and inbound packets and is able to determine which application is associated with each outbound packet 255. The UE-ETDF 210 then determines whether the outbound packet 255 initiates a new encrypted flow and insert the corresponding AppKey into the packet, forming the modified packet 260 (e.g., packet+AppKey). In the depicted embodiment, the modified packet 260 is returned to the UE networking stack 230 via the iptables kernel module 250 and is transmitted to the network (e.g., to the UPF 141).

Figure 3:
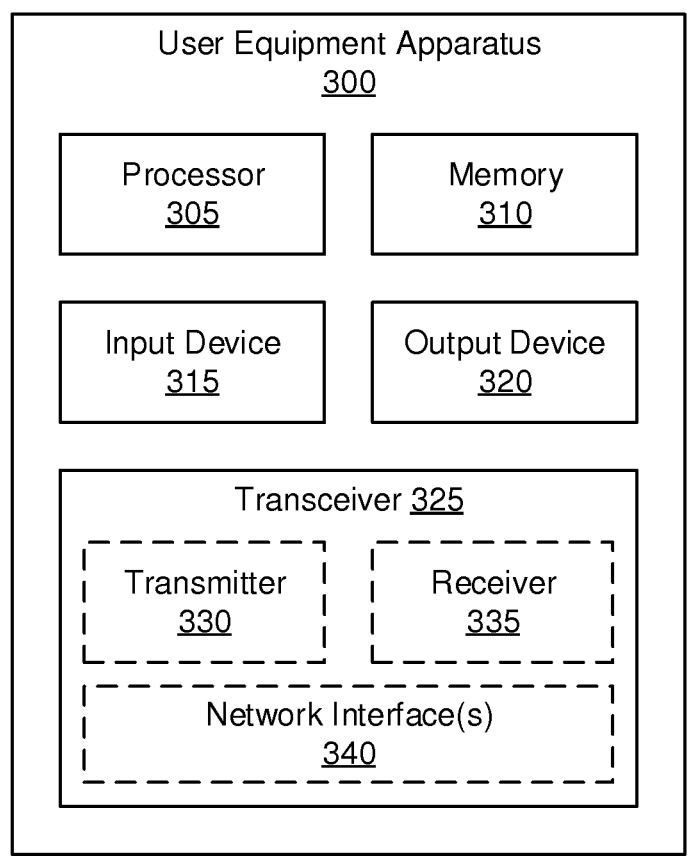
FIG. 3 is a schematic block diagram illustrating one embodiment of a user equipment apparatus for PDU Session Establishment for encrypted traffic detection.

FIG. 3 depicts one embodiment of a user equipment apparatus 300 that may be used for PDU Session Establishment for encrypted traffic detection, according to embodiments of the disclosure. The user equipment apparatus 300 may be one embodiment of the SMF 146. Furthermore, the user equipment apparatus 300 may include a processor 305, a memory 310, an input device 315, an output device 320, and a transceiver 325. In some embodiments, the input device 315 and the output device 320 are combined into a single device, such as a touch screen. In certain embodiments, the user equipment apparatus 300 does not include any input device 315 and/or output device 320.

As depicted, the transceiver 325 includes at least one transmitter 330 and at least one receiver 335. Additionally, the transceiver 325 may support at least one network interface 340. Here, the at least one network interface 340 facilitates communication with a eNB or gNB (e.g., using the Uu interface). Additionally, the at least one network interface 340 may include an interface used for communications with an UPF and a NW-ETDF.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the output device 320, and the transceiver 325.

In some embodiments, the processor 305 transmits a request to establish a PDU session with a mobile communication network (e.g., the mobile core network 140). Moreover, the processor 305 receives a PDU session establishment response from the mobile communication network. Here, the response includes a list of one or more application identifiers of applications for which the user equipment apparatus 300 is to provide encrypted traffic detection information when sending encrypted traffic over the established PDU session. Accordingly, the processor 305 calculates encrypted traffic detection information for each application identifier in the list.

In response to detecting the start of an encrypted data flow of a first application in the list, the processor 305 modifies a data packet associated with the start of the encrypted data flow to include the encrypted traffic detection information of the first application. Additionally, the processor 305 controls the transceiver 325 to send the modified data packet to the mobile communication network. In certain embodiments, the processor 305 modifies a predetermined number of packets at the beginning of the encrypted data flow (e.g., the first 2-3 packets) to include the encrypted traffic detection information of the first application.

In one embodiment, the request to establish a PDU session comprises data includes an indication that the user equipment apparatus 300 is able to provide encrypted traffic detection information. In a different embodiment, the processor 305 registers with the mobile communication network prior to transmitting the request to establish a PDU session and transmits the indication that the user equipment apparatus 300 is able to provide encrypted traffic detection information during the registration process. In various embodiments, the indication that the apparatus can provide encrypted traffic detection information includes a device identifier of the user equipment apparatus 300 (e.g., a IMEI) and an operating system identifier of an operating system running on the processor.

In some embodiments, calculating the encrypted traffic detection information includes the processor 305 generating a signature of the UE-ETDF. Moreover, the encrypted traffic detection information may be an application key. In such embodiments, calculating encrypted traffic detection information for each application identifier in the list includes the processor 305 generating an application key for each application identifier in the list using the UE-ETDF signature and the application identifier.

In certain embodiments, the PDU session establishment response includes a randomly-generated value. In such embodiments, calculating the encrypted traffic detection information (e.g., application key) for each application identifier in the list includes the processor 305 generating an application key for each application identifier in the list using the UE-ETDF signature, the randomly-generated value, and the application identifier.

In certain embodiments, the processor 305 implements a UE-ETDF. In other embodiments, the UE-ETDF may be implemented by other circuitry of the user equipment apparatus. In one embodiment, the processor 305 downloads the UE-ETDF from a NW-ETDF in the mobile communication network prior to transmitting the request to establish a PDU session. Note that the UE-ETDF is one of a plurality of ETDF instances downloaded from the NW-ETDF. However, each UE-ETDF has a signature that is different from the signature of all other ETDFs downloaded from the NW-ETDF.

In some embodiments, the processor 305 performs an authentication with a network encrypted traffic detection function ("NW-ETDF"). Here, the NW-ETDF verifies that a UE-ETDF in the user equipment apparatus 300 is authentic. In some embodiments, the processor 305 creates an encrypted traffic detection key upon successful authentication. In one embodiment, the encrypted traffic detection key is a signature of the UE-ETDF, for example generated using a hash function.

The processor 305 detects a data packet generated by a first application. Here, the first application may be a user application or may be an operating system ("OS") application. Moreover, the processor 305 determines whether the data packet is associated with the start of an encrypted data flow for the first application.

In certain embodiments, determining whether the data packet is associated with the start of an encrypted data flow includes the processor 305 determining whether an application identifier of the first application is included in a list of application identifiers for which encrypted traffic detection information is to be provided. In one embodiment, the list of application identifiers may be received from the NW-ETDF.

In another embodiment, the list of application identifiers may be received from the mobile core network 140, e.g., from the PCF 147.

In response to the application identifier of the first application being included in the list of application identifiers, the processor 305 identifies a packet type for the detected data packet. Note that certain data packet types are associated with the start of an encrypted data flow. For example, the at least one packet type associated with an encrypted data flow may be one of: a Transmission Control Protocol Synchronize ("TCP SYN") packet with destination port of '443,' a Transport Layer Security protocol ("TLS") "ClientHello" packet, and a User Datagram Protocol ("UDP") packet to port '80,' or other combination of protocol and specific destination port, or other specific packet. The processor 305 determines whether the packet type matches at least one packet type associated with an encrypted data flow in order to determine whether the data packet is associated with the start of an encrypted data flow.

As discussed above, in response to determining that the data packet is associated with the start of an encrypted data flow, the processor 305 modifies the data packet to include detection information. Here, the detection information may be the application key created from the application identifier. For example, the application key may be created using a hash function with the application identifier and an encrypted traffic detection key, such as the UE-ETDF signature, being inputs to the hash function. In certain embodiments, the processor 305 generates an application key for each application identifier in the list of application identifiers.

The detection information (e.g., application key) may be placed in a header of the data packet. In one embodiment, an extension header is used which contains the detection information (e.g., application key). In other embodiments, the detection information is added to the data packet by encapsulating the data packet. Adding the detection information to the data packet is discussed in further detail below, with reference to FIG. 6.

Moreover, the processor 305 controls the transceiver 325 to send the modified data packet to the mobile communication network (e.g., to the access network 120 and mobile core network 140). As discussed in further detail below, the processor 305 may further identify one or more additional data packets belonging to the data flow. Here, the one or more additional data packets are sent without the detection information. As discussed above, the processor 305 may modify a predetermined number of packets at the beginning of the encrypted data flow to include the application key, or other encrypted traffic detection information.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media. In some embodiments, the memory 310 stores data relating to PDU Session Establishment for encrypted traffic detection, for example storing application lists, detection information, application keys, a UE-ETDF signature, and the like. In certain embodiments, the memory 310 also stores program code and related data, such as an operating system or other controller algorithms operating on the user equipment apparatus 300 and one or more software applications.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The output device 320, in one embodiment, may include any known electronically controllable display or display device. The output device 320 may be designed to output visual, audible, and/or haptic signals. In some embodiments, the output device 320 includes an electronic display capable of outputting visual data to a user. For example, the output device 320 may include, but is not limited to, an LCD display, an LED display, an OLED display, a projector, or similar display device capable of outputting images, text, or the like to a user. As another, non-limiting, example, the output device 320 may include a wearable display such as a smart watch, smart glasses, a heads-up display, or the like. Further, the output device 320 may be a component of a smart phone, a personal digital assistant, a television, a table computer, a notebook (laptop) computer, a personal computer, a vehicle dashboard, or the like.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, all or portions of the output device 320 may be located near the input device 315.

The transceiver 325 communicates with one or more network functions of a mobile communication network. The transceiver 325 operates under the control of the processor 305 to transmit messages, data, and other signals and also to receive messages, data, and other signals. For example, the processor 305 may selectively activate the transceiver (or portions thereof) at particular times in order to send and receive messages. The transceiver 325 may include one or more transmitters 330 and one or more receivers 335.

Figure 4:
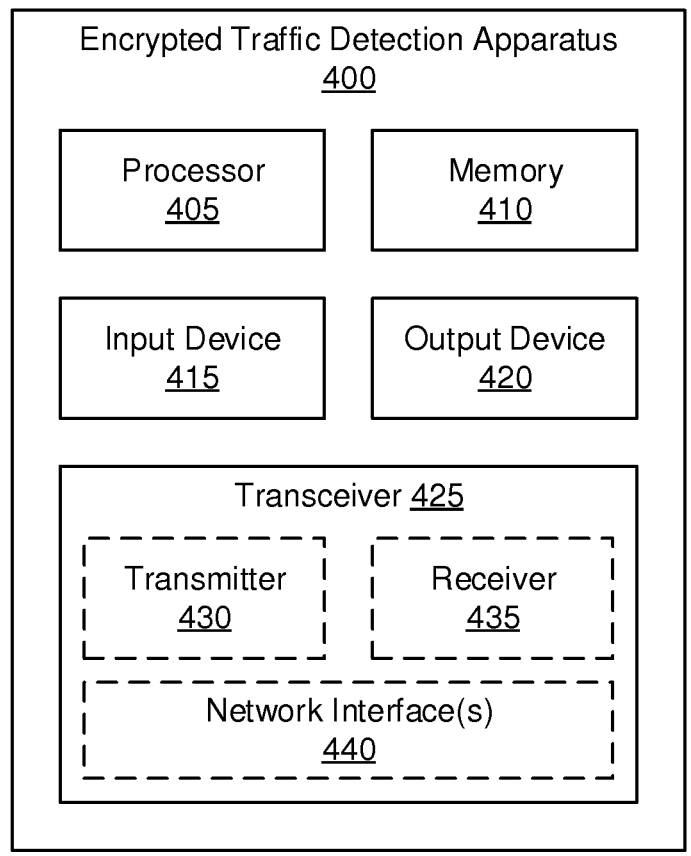
FIG. 4 is a schematic block diagram illustrating one embodiment of an encrypted traffic detection apparatus for PDU Session Establishment for encrypted traffic detection.

FIG. 4 depicts one embodiment of an encrypted traffic detection apparatus 400 that may be used for PDU Session Establishment for encrypted traffic detection, according to embodiments of the disclosure. The encrypted traffic detection apparatus 400 may be one embodiment of the NW-ETDF 154. Furthermore, the encrypted traffic detection apparatus 400 may include a processor 405, a memory 410, an input device 415, an output device 420, and a transceiver 425. In some embodiments, the input device 415 and the output device 420 are combined into a single device, such as a touch screen. In certain embodiments, the encrypted traffic detection apparatus 400 does not include any input device 415 and/or output device 420.

As depicted, the transceiver 425 includes at least one transmitter 430 and at least one receiver 435. Additionally, the transceiver 425 may support at least one network interface 440. Here, the at least one network interface 440 facilitates communication with a remote unit 105, such as the UE 205, with other network functions in a mobile core network 140, such as the PCF 147.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In some embodiments, the processor 405 receives a request to generate encrypted traffic detection information for a list of one or more application identifiers. Here, the request may be sent to the encrypted traffic detection apparatus 400 in response to a remote unit (e.g., the UE 205) requesting to establish a Packet Data Unit ("PDU") session with the mobile communication network. The processor 405 retrieves a signature for the remote unit. Specifically, the retrieved signature may be a signature of a UE-ETDF on the remote unit.

Moreover, the processor 405 calculates encrypted traffic detection information for each application identifier in the list using the signature and controls the transceiver 425 to transmit both the list of one or more application identifiers and corresponding encrypted traffic detection information (e.g., for each application identifier in the list) to the mobile communication network. Here, the list of one or more application identifiers is a list of application identifiers for which the remote unit is to provide encrypted traffic detection information when an application having an application identifier in the list sends encrypted traffic over the established PDU session.

In some embodiments, the processor 405 receives a request from the remote unit to download a UE-ETDF prior to receiving the request to generate encrypted traffic detection information. In such embodiments, the retrieved signature is a signature of the UE-ETDF downloaded to the remote unit. As discussed above, the signature may be generated from the UE-ETDF using a hash function. In certain embodiments, the request to download the UE-ETDF includes a device identifier of the remote unit (e.g., an IMEI) and an operating system identifier of an operating system running on the remote unit. Using these identifiers, the processor 405 generates an instance of the UE-ETDF with a unique signature, e.g., one that is different from the signature of all other UE-ETDF instances.

In various embodiments, the encrypted traffic detection information is an application key. In such embodiments, calculating encrypted traffic detection information for each application identifier in the list includes the processor 405 generating an application key for each application identifier in the list using the application identifier and the UE-ETDF signature. In certain embodiments, the request to generate encrypted traffic detection information includes a randomly-generated value. Here, calculating encrypted traffic detection information for each application identifier in the list includes the processor 405 generating an application key for each application identifier in the list using the signature, the randomly-generated value, and the application identifier.

In some embodiments, the processor 405 authenticates an encrypted traffic detection function ("ETDF") of the remote unit (e.g., the UE-ETDF 210). Here, the processor 405 verifies the authenticity of the UE-ETDF. Moreover, the processor 405 creates a common encrypted traffic detection key, e.g., after a successful authentication of the ETDF of the remote unit. In one embodiment, the encrypted traffic detection key is a signature of the UE-ETDF, for example generated using a hash function.

The processor 405 provides the remote unit (e.g., the UE 205) with a list of application identifiers for which encrypted traffic detection information is to be provided. Additionally, the processor 405 generates detection information for each application in the list of application identifiers. Having generated the detection information, the processor 405 sends the list of application identifiers and the detection information for each application in the list of application identifiers to a network function in the mobile communication network, such as the PCF 147.

As discussed above, the detection information may be an application key unique to each application. Here, the processor 405 generates an application key for each application in the list of application identifiers based on an application identifier of each application and an encrypted traffic detection key, such as the UE-ETDF signature. For example, a hash function may be used to generate the application key from the application identifier and the encrypted traffic detection key.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to PDU Session Establishment for encrypted traffic detection, for example storing a list of application identifiers and corresponding detection information, various UE-ETDF signatures, and the like. In certain embodiments, the memory 410 also stores program code and related data, such as an operating system or other controller algorithms operating on the traffic detection apparatus 400 and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, all or portions of the output device 420 may be located near the input device 415.

The transceiver 425 communicates with a remote unit (e.g., a UE 205) and at least one or more network functions of a mobile communication network (e.g., the PCF 147). The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. The transceiver 425 may include one or more transmitters 430 and one or more receivers 435.

Figure 5:
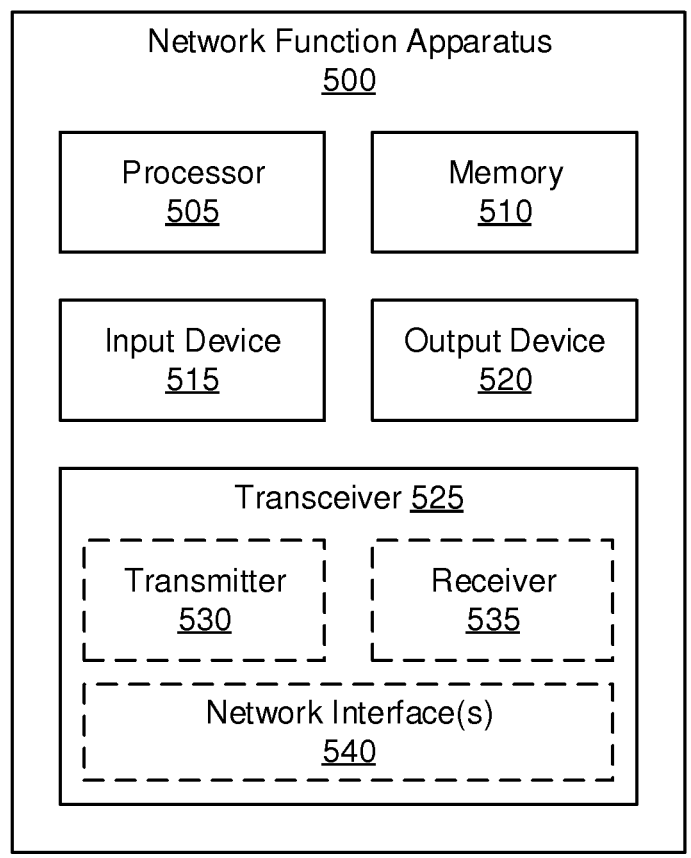
FIG. 5 is a schematic block diagram illustrating one embodiment of a network function apparatus for PDU Session Establishment for encrypted traffic detection.

FIG. 5 depicts one embodiment of a network function apparatus 500 that may be used for suspending services in a first core network while attached to a second core network, according to embodiments of the disclosure. The network function apparatus 500 may be one embodiment of the PCF 147. Furthermore, the network function apparatus 500 may include a processor 505, a memory 510, an input device 515, an output device 520, and a transceiver 525. In some embodiments, the input device 515 and the output device 520 are combined into a single device, such as a touch screen. In certain embodiments, the network function apparatus 500 does not include any input device 515 and/or output device 520.

As depicted, the transceiver 525 includes at least one transmitter 530 and at least one receiver 535. Additionally, the transceiver 525 may support at least one network interface 540. Here, the at least one network interface 540 facilitates communication with a remote unit 105, such as the UE 205, with other network functions in a mobile core network 140, such as the SMF 143, and also with a remote host or server in the data network 150.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In some embodiments, the processor 505 receives a policy request from a first network function, such as the SMF 143. Here, the policy request includes data indicating that a remote unit (e.g., the UE 205) can provide encrypted traffic detection information. In one embodiment, the SMF 143 sends the policy request in response to the remote unit requesting to establish a Packet Data Unit ("PDU") session with the mobile communication network.

In response to the policy request, the processor 505 generates a list of one or more application identifiers for which the remote unit is to provide encrypted traffic detection information when an application having an application identifier in the list sends encrypted traffic over the established PDU session. Additionally, the processor 505 transmits to a second network function (e.g., to a NW-ETDF) a request to generate encrypted traffic detection information for the list of one or more application identifiers and receives encrypted traffic detection information for each application identifier in the list from the second network function. Moreover, the processor 505 transmits a policy response to the first network function. Here, the policy response includes the list of one or more application identifiers and the encrypted traffic detection information corresponding to the list.

In certain embodiments, the data indicating the remote unit is able to provide encrypted traffic detection information includes a device identifier of the remote unit (e.g., an IMEI) and an operating system identifier of an operating system running on the remote unit. Additionally, the request to generate encrypted traffic detection information may include the device identifier of the remote unit.

In certain embodiments, the processor 505 generates a random value. In such embodiments, the request to generate encrypted traffic detection information contains the randomly-generated value. In further embodiments, the encrypted traffic detection information for each application identifier may be based on the randomly-generated value. Moreover, the policy response may contain the randomly-generated value.

In some embodiments, the processor 505 receives a list of application identifiers and detection information for each application in the list of application identifiers from a network function. Here, the list of application identifiers are UE-run applications for which encrypted traffic detection is desired. Moreover, the detection information for each application may be an Application Key ("AppKey") as discussed herein. Note that the various identifiers in the list of application identifiers may be different lengths. In various embodiments, however, the AppKeys (e.g., detection information) are a consistent length. In certain embodiments, the processor 505 receives the list of application identifiers and corresponding detection information from a SMF 143 in the mobile core network 140.

Additionally, the processor 505 receives a first data packet from a remote unit, such as the remote unit 105 or the UE 205 described above. Here, the first data packet includes first detection information. In various embodiments, the first detection information is an AppKey. The processor 505 identifies an application from the list of application identifiers using the detection information (e.g., using the AppKey).

The processor 505 then applies a first traffic rule to the first data packet. Here, the first traffic rule is selected based on the identified application. For example, the first traffic rule may instruct the network function apparatus 500 to forward the first data packet. As another example, the first traffic rule may instruct the network function apparatus 500 to drop the first data packet. Each traffic rule is associated with one or more applications.

In certain embodiments, the processor 505 receives a list of traffic rules, e.g., from the SMF 143. Here, the processor 505 applies the first traffic rule to the first data packet by selecting a traffic rule associated with the identified application and applying the selected traffic rule to the first data packet. In one embodiment, the list of traffic rules is received with the list of application identifiers and corresponding detection information. In another embodiment, the list of traffic rules is received separately from the list of application identifiers and corresponding detection information. In further embodiments, the processor 505 may receive an updated list of traffic rules from the SMF 143.

Moreover, the processor 505 may receive a second data packet from the remote unit, the second data packet having an encrypted payload. In such embodiments, the processor 505 determines whether the second data packet includes detection information. Note that the UE 205 includes detection information with a data packet associated with the start of an encrypted traffic flow. In response to the second data packet not including detection information, the processor 505 may associate the second data packet with the first data packet. Note that data packets are determined to be associated with one another when the share the same 5-tuple (i.e., destination address, source address, destination port, source port, and protocol type) in the header. In response to associating the second data packet with the first data packet, the processor 505 applies the first traffic rule to the second data packet. Moreover, any subsequent data packets sharing the same 5-tuple as the first data packet will also belong to the same (encrypted) traffic flow and the processor 505 will apply the first traffic rule to these subsequent data packets as well.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media. In some embodiments, the memory 510 stores data relating to PDU Session Establishment for encrypted traffic detection, for example storing a list of traffic rules, a list of application identifiers and corresponding detection information, data flow information, and the like. In certain embodiments, the memory 510 also stores program code and related data, such as an operating system or other controller algorithms operating on the network function apparatus 500 and one or more software applications.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, may include any known electronically controllable display or display device. The output device 520 may be designed to output visual, audible, and/or haptic signals. In some embodiments, the output device 520 includes an electronic display capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, all or portions of the output device 520 may be located near the input device 515.

The transceiver 525 communicates with a remote unit (e.g., a UE 205), one or more network functions of a mobile communication network (e.g., the SMF 143), and a remote data network (e.g., the remote server 152 in the data network 150). The transceiver 525 operates under the control of the processor 505 to transmit messages, data, and other signals and also to receive messages, data, and other signals. For example, the processor 505 may selectively activate the transceiver (or portions thereof) at particular times in order to send and receive messages. The transceiver 525 may include one or more transmitters 530 and one or more receivers 535.

Figure 6A:
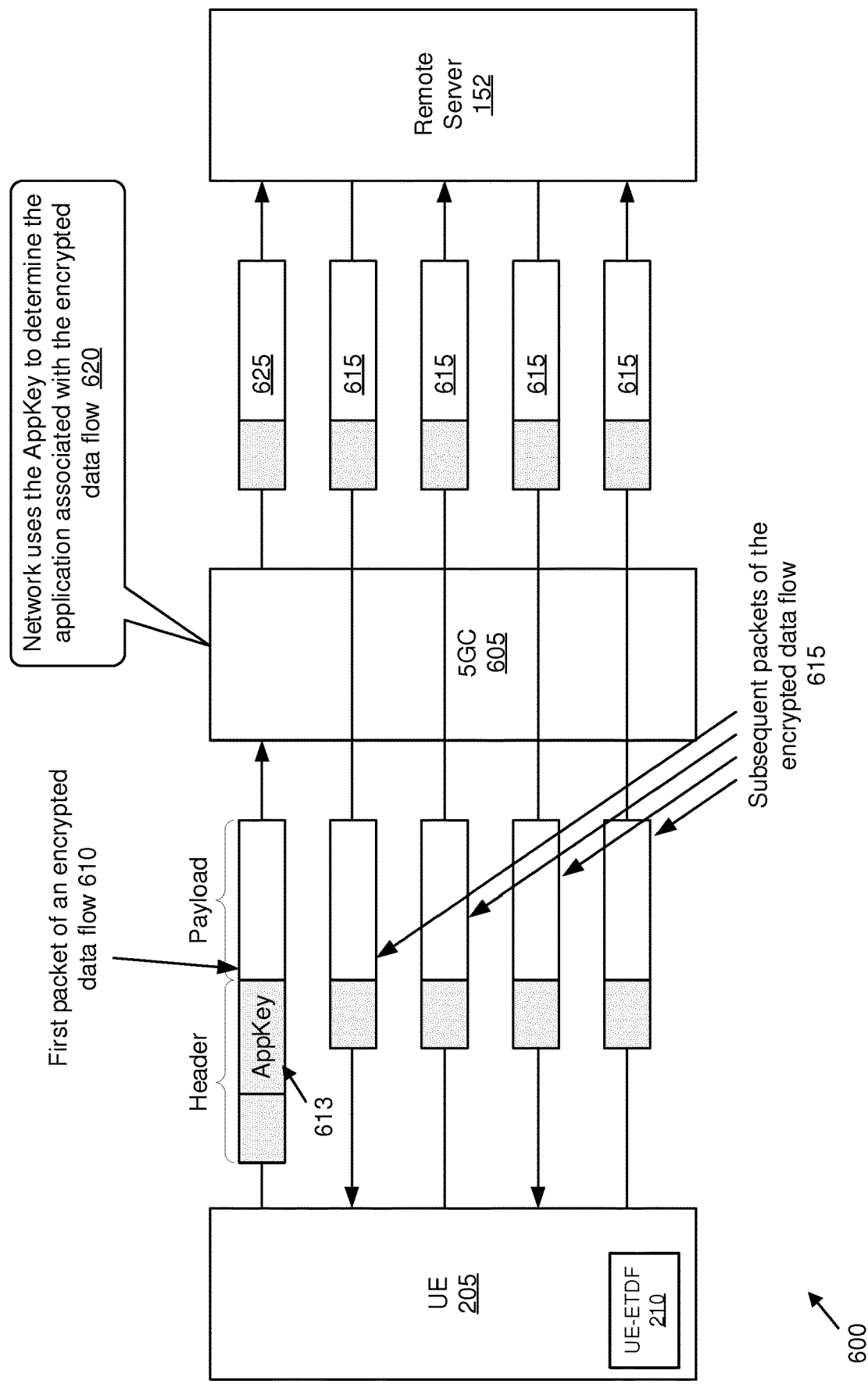
FIG. 6A is a block diagram illustrating one embodiment of identifying an encrypted traffic flow.

FIG. 6A depicts a diagram 600 of an UE 205 identifying an encrypted traffic flow and providing encrypted traffic detection information to the network, here a 5GC 605. Here, the UE 205 includes a UE-ETDF 210. Here, the UE 205 includes an AppKey 613 in the first packet 610 of an encrypted data flow. The first packet 610 of an encrypted data flow may be, e.g., a TCP SYN packet to port '443,' a TLS 'ClientHello' packet, a UDP packet to port '80' (e.g., QUIC), etc. When the UE-ETDF 210 detects the first packet 610 that initiates an encrypted data flow, it determines the application that triggered this packet and then piggybacks to this first packet the AppKey 613 corresponding to this application. The AppKey 613 can be piggybacked in the first packet 610 of an encrypted data flow with various mechanisms, for example encapsulated within GRE ("Generic Routing Encapsulation") or added to an IP header, TCP header, or TLS header.

In the depicted embodiment, the AppKey 613 is piggybacked only to the first packet 610 of an encrypted data flow. The subsequent packets 615 of the encrypted data flow do not carry the AppKey 613 or any other additional information. However, in other embodiments the UE 205 piggybacks the AppKey 613 onto the first 2-3 packets, instead of the first packet only, to account for transmission errors. The 5GC 605 uses the AppKey 613 to associate the data flow with the application that corresponds to this AppKey 613 (see block 620). The 5GC 605 (e.g., the UPF 141) strips the AppKey 613 from the first packet 610 before routing the de-piggybacked packet 625 to the remote server 152.

Figure 6B:
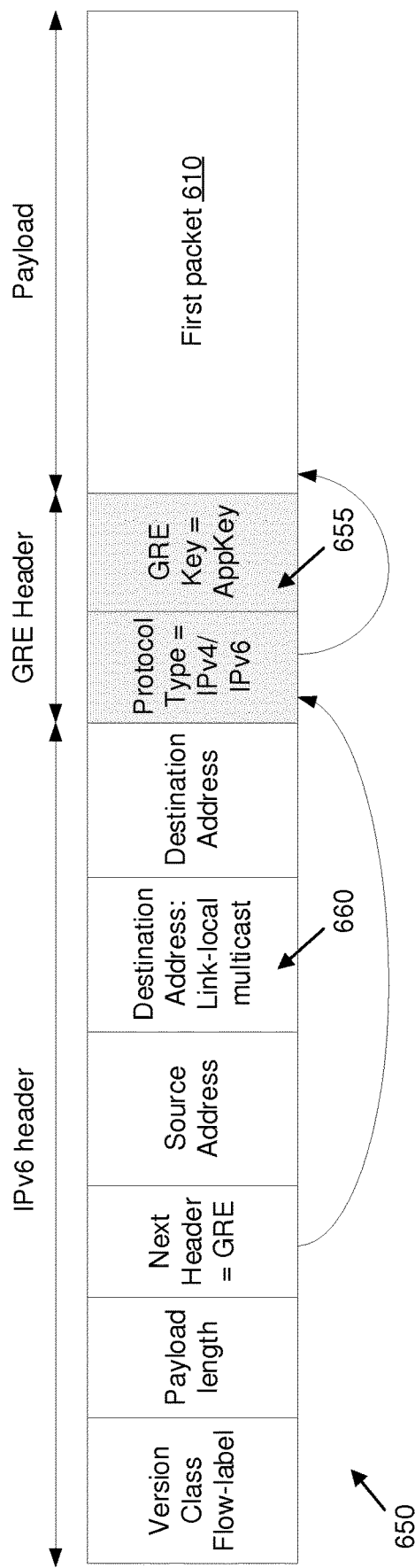
FIG. 6B is a block diagram illustrating one embodiment of a modified data packet for identifying an encrypted traffic flow.

FIG. 6B depicts a packet diagram 650 showing a modified packet that includes encrypted traffic detection information, here the AppKey 613. In the depicted embodiment, the first packet 610 may be encapsulated within GRE ("Generic Routing Encapsulation") and use the AppKey 613 as a GRE Key 655.

The encapsulated packet is to be sent to a link-local multicast address 660. In the depicted embodiment, IPv6 is used between the UE 205 and the UPF 141. Here, the UPF 141 is configured to check all packets destined to this link-local multicast address. The UPF 141 retrieves the AppKey from the GRE header and forwards the first packet 610 to its final destination, as discussed above.

In other embodiments, the AppKey is piggybacked to the first packet 610 by inclusion into an IP header, TCP header, or TLS header. For example, when the UE 205 uses IPv6 communication, the AppKey 613 may be included in a new IPv6 Extension Header. As another example, when the UE 205 uses IPv4 communication, the AppKey 613 may be included by using a new Protocol Type value. In one embodiment, the AppKey 613 may be included in the TCP header, e.g., by using a new TCP Option. In another embodiment, the AppKey 613 may be included in the TLS header, e.g. by using a new TLS Extension Type.

Figure 6C:
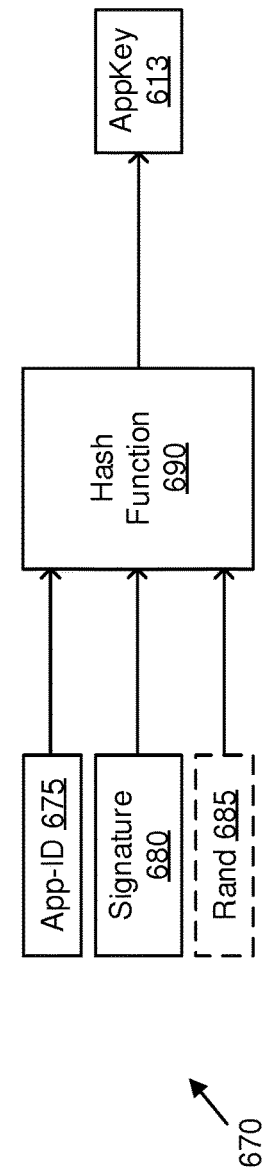
FIG. 6C is a block diagram illustrating one embodiment of a procedure for generating encrypted traffic detection information.

FIG. 6C depicts an exemplary procedure 670 for creating the AppKey 613. Here, the application identifier 675 and the UE-ETDF signature 680 are input into a hash function 690. In certain embodiments, a random value 685 is also received and input into the hash function 690. The output of the hash function 690 is the AppKey 613. The AppKey 613 may a fixed-sized number and small enough (e.g. 16 bits) for efficient inclusion in a data packet.

Figure 7:
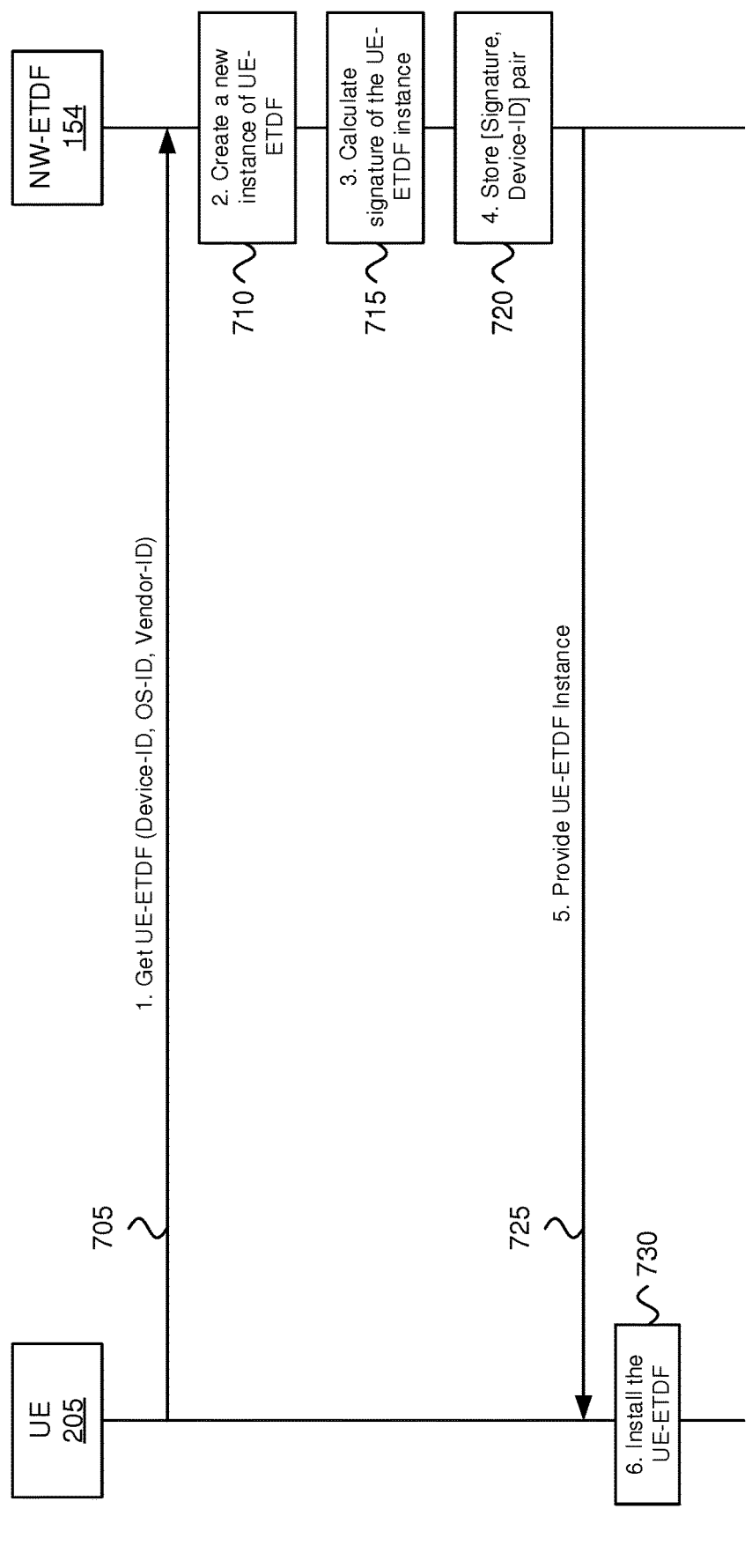
FIG. 7 is a block diagram illustrating one embodiment of a procedure for retrieving a user equipment encrypted traffic detection function.

FIG. 7 depicts a network procedure 700 for provisioning a UE 205 with a unique instance of a UE-ETDF 156, according to embodiments of the disclosure. The network procedure 700 involves the UE 205 and the NW-ETDF 154. The network procedure 700 begins when the UE 205 determines it has no UE-ETDF 210 and attempts to download one from a NW-ETDF 154 located in the home PLMN of the UE 205. For this purpose, the UE 205 discovers the IP address of NW-ETDF 154 (e.g. by making a DNS query or by using pre-configured information) and establishes a secure connection with the NW-ETDF (e.g. with TLS/SSL).

The UE 205 sends (over the secure connection) a request to the NW-ETDF 154 to get a UE-ETDF instance. Here, the request includes the Device-ID (e.g. IMEI) of the UE 205, its Operating System ID (OS-ID) and, optionally, a Vendor-ID (see messaging 705). The OS-ID is required so that the NW-ETDF 154 can provide a UE-ETDF suitable for the operating system running on the UE 205. In certain embodiments, the UE 205 includes a Vendor-ID, such as when the NW-ETDF 154 needs to relay the get request to a vendor-specific NW-ETDF, or when the NW-ETDF 154 needs to provide a vendor-specific UE-ETDF 210 to the UE 205. For example, the NW-ETDF 154 may provide to all Lenovo UEs 205 a Lenovo-specific and OS-specific UE-ETDF 210.

In response to the request from the UE 205, the NW-ETDF 154 creates a unique instance of the UE-ETDF 210 for this UE 205 (see block 710). A unique instance is required so that every UE 205 has a UE-ETDF 210 with a different "signature." The signature of the UE-ETDF 210 is calculated by an algorithm known only to the UE-ETDF 210 and to the NW-ETDF 154 (e.g. by using a hash function). Accordingly, another entity (e.g., other than a specific UE-ETDF 210 and the NW-ETDF 154) cannot derive the signature of the specific UE-ETDF 210 because it cannot determine the algorithm for calculating the signature. The NW-ETDF 154 creates the UE-ETDF instance by considering the OS-ID and, optionally, the Vendor-ID provided by the UE 205.

Having created the new UE-ETDF instance, the NW-ETDF 154 calculates the signature of the created UE-ETDF instance (see block 715). As discussed herein, the signature of a UE-ETDF 210 is used by the UE-ETDF 210 and by the NW-ETDF 154 for calculating the application keys that are to be provided by the UE 205 as "encrypted data traffic detection" information. Additionally, the NW-ETDF 154 stores the calculated signature together with the Device-ID provided by the UE 205 (see block 720). This signature will be used later when the NW-ETDF 154 is requested to provide one or more application keys (or other detection information) for this UE 205, identifiable by the Device-ID.

The NW-ETDF 154 sends the created UE-ETDF instance to the UE 205 (see messaging 725). The UE 205 installs and activates the UE-ETDF 210 (see block 730). The UE-ETDF 210 is given the necessary privileges to perform operations, such as inspecting the incoming and outgoing data traffic in the UE 205. The network procedure 700 ends.

While FIG. 7 is depicted as initiating due to UE actions, in other embodiments, the network procedure 700 may be initiated by a trusted network function. In an exemplary scenario, a UE manufacturer may send the request to get a UE-ETDF instance (refer to messaging 705, above) to the NW-ETDF 154 via the trusted network function, receive the new (unique) UE-ETDF instance, and then program this UE-ETDF instance in the UE 205. Accordingly, in various embodiments the UE-ETDF may be downloaded by the UE 205 itself, or by a trusted third party who then stores the UE-ETDF to the UE 205.

Figure 8:
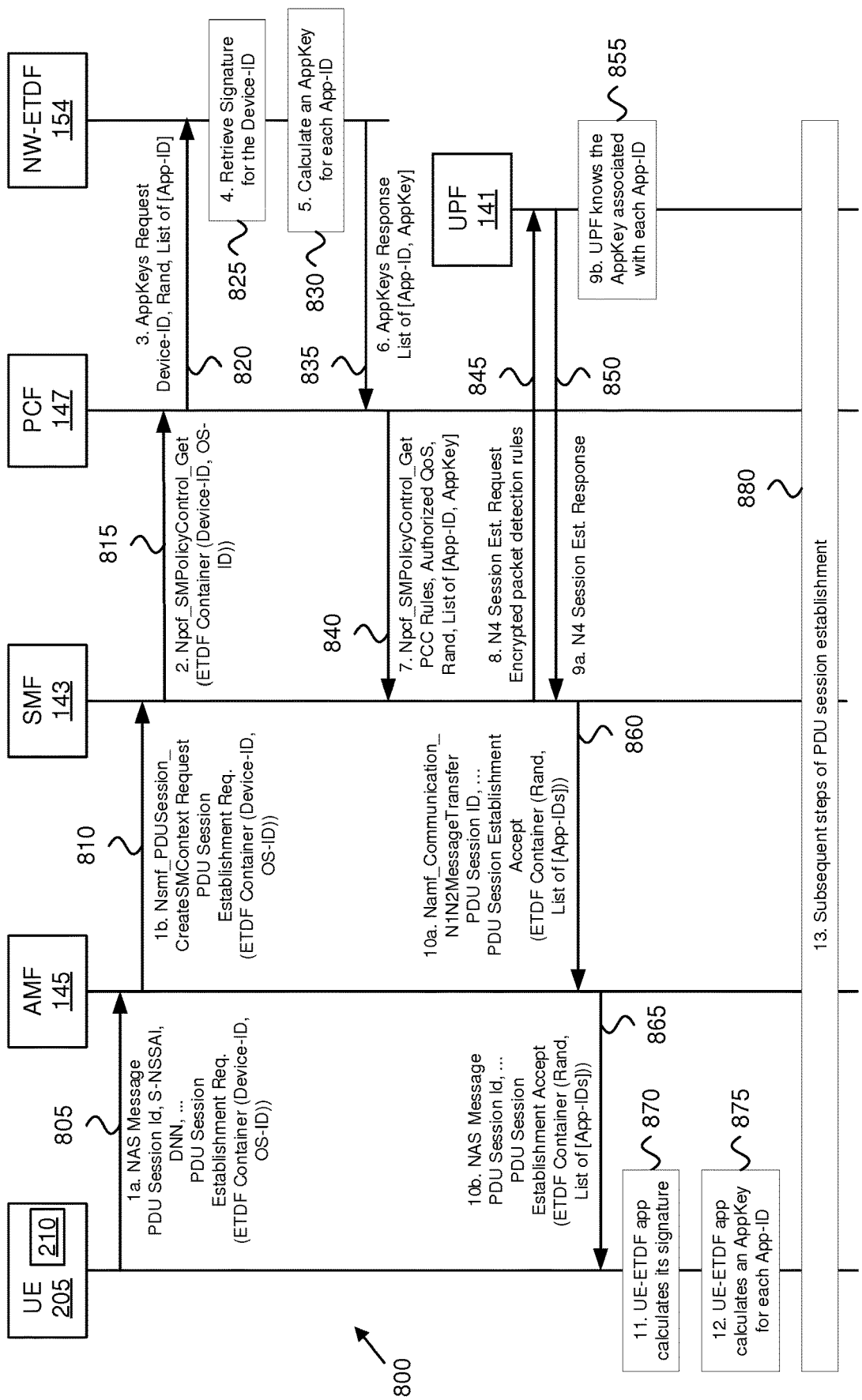
FIG. 8 is a block diagram illustrating one embodiment of a network procedure for establishing a PDU Session for encrypted traffic detection

FIG. 8 depicts a network procedure 800 for a UE 205 having a UE-ETDF 210 to establish a PDU session. The network procedure 800 involves a UE 205 (having installed thereon a unique instance of a UE-ETDF 210), the AMF 145, the SMF 143, the PCF 147, and the NW-ETDF 154. As discussed herein, a PDU session is essentially a data connection between the UE and an external Data Network (DN). Moreover, the UE 205 having the UE-ETDF 210 is able to provide "encrypted traffic detection information" to the network.

The network procedure 800 begins as the UE 205 sends a NAS Message that includes a PDU Session Establishment Request, which in turn contains an ETDF Container (see signaling 805). The ETDF container indicates to the network that the UE 205 can provide encrypted data traffic detection information (an AppKey, in this embodiment) for the encrypted data flows sent over this PDU session. The ETDF Container includes the Device-ID (e.g., IMEI) and the OS-ID (e.g., Android, iOS, etc.) of the UE 205.

The AMF 145 receives the NAS Message containing the PDU Session Establishment Request from the UE 205 and sends a session management message to the SMF 143 that contains the PDU Session Establishment Request with its included ETDF Container (see signaling 810). Note that in an alternative embodiment, the UE 205 does not include the ETDF Container in the PDU Session Establishment Request message, but it includes the ETDF Container in an initial Registration Request message sent to AMF 145. In this embodiment, the AMF 145 then stores the ETDF Container in the UE Context and forwards the ETDF Container to the SMF 143 whenever the UE 205 requests a new PDU session.

The SMF 143 receives the PDU Session Establishment Request (via the AMF 145) and requests policy from the PCF 147 by invoking a Npcf_SMPolicyControl_Get operation (see signaling 815), for example as specified in 3GPP TS 23.502. Note that the ETDF Container provided by the UE 205 (either in the PDU Session Establishment Request or in the initial Registration Request message) is forwarded to PCF 147.

Because the PCF 147 receives the ETDF Container, it knows that the UE 205 is capable of providing encrypted data traffic detection information (e.g., an application key). In response to the policy request, the PCF 147 creates a list of applications for which the UE 205 is to provide encrypted data traffic detection information. For example, the PCF 147 may create the list [App-1, App-2, App-3] if the network wants to detect the encrypted data flows associated with App-1, App-2 and App-3. The PCF 147 takes into account the OS-ID in the received ETDF Container in order to create the application identities for the operating system supported by the UE 205. The PCF 147 requests from the NW-ETDF 154 the AppKeys associated with the applications in the list (see signaling 820). In certain embodiments, the PCF 147 may provide a random number, Rand, to the NW-ETDF 154 for calculating the AppKeys.

Based on the Device-ID received from the PCF 147, the NW-ETDF 154 retrieves the signature of the UE-ETDF 210 in the UE 205 (see block 825). Where the UE-ETDF 210 was downloaded from NW-ETDF 154 (as shown in FIG. 2.4.1-1), the NW-ETDF 154 calculated and stored the signature before delivering the UE-ETDF 210 to UE 205. Alternatively, where the UE-ETDF 210 was not downloaded from NW-ETDF 154 (e.g., but was pre-installed in the UE 205), the NW-ETDF 154 is provisioned with the signature of the UE-ETDF 210.

Moreover, the NW-ETDF 154 uses the stored signature of the UE-ETDF 210, the Application identity, and (if provided) the Rand to calculate the AppKey for each application in the list (see block 830). The calculation of the AppKey may be based on a hash function as shown in FIG. 6C. Having calculated AppKeys for each application in the list, the NW-ETDF 154 provides to the PCF 147 an AppKey for each one of the requested applications (see signaling 835).

The PCF 147 sends to SMF 143 the requested PCC rules and the authorized QoS. In addition, the PCF 147 sends to the SMF 143 the list of application identifiers and the associated AppKeys received from the NW-ETDF 154 (see signaling 840). If the PCF 147 has sent a Rand value to the NW-ETDF 154, the PCF 147 also sends this Rand value to the SMF 143. After receiving the list of application identifiers and associated AppKeys, the SMF 143 sends an N4 Session Establishment Request that includes encrypted packet detection rules to the UPF 141 (see signaling 845). Here, each packet detection rule includes an AppKey and the associated application identifier. The UPF 141 sends a N4 Session Establishment Response to the SMF 143 (see signaling 850).

At this point, the UPF 141 knows which AppKeys to look for in traffic from the UE 205 and which application identifiers correspond to each AppKey (see block 855) and is able to use AppKeys received from the UE 205 (e.g., in the first packet of each encrypted data flow) to detect the application associated with every encrypted data flow. Additionally, the UPF 141 is able to detect an untrusted UE-ETDF 210 by receiving an AppKey from the UE 205 that was not included in the AppKeys sent by the SMF 143.

Additionally, the SMF 143 sends a PDU Session Establishment Accept message to the AMF 145 within a session management message (see signaling 860) and the AMF 145 forwards the PDU Session Establishment Accept message to the UE in a NAS message (see signaling 865). Note that the PDU Session Establishment Accept message includes a second ETDF Container. This second ETDF container indicates to UE that it is to activate encrypted traffic detection and that it is to provide AppKeys to the network over the user plane. As discussed above, these AppKeys assist the network identifying the application associated with every encrypted data flow. Moreover, the ETDF Container includes the list of applications for which the UE 205 is to provide 'encrypted data traffic detection information' (e.g., the list created by PCF 147) and includes also the Rand if generated by the PCF 147.

In response to receiving the PDU Session Establishment Accept message, the UE-ETDF 210 in the UE 205 calculates its own signature (see block 870), for example, using the procedure 670 described above with reference to FIG. 6C. Additionally, the UE-ETDF 210 in the UE 205 uses its own signature, the Rand, and the Application Identity to calculate the AppKey for each application in the received list (see block 875). It uses exactly the same calculation as the NW-ETDF 154 in block 830. Thus, the UE 205 derives exactly the same AppKeys as the AppKey derived by NW-ETDF 154 and provided to UPF 141.

Finally, the UE 205 completes the PDU session establishment procedure (see block 880). After establishing the PDU session, the UE-ETDF 210 detects the encrypted data flows initiated by the applications in the received list and, in the first packet of every encrypted data flow, it adds the AppKey of the application which initiated this flow.

Figure 9:
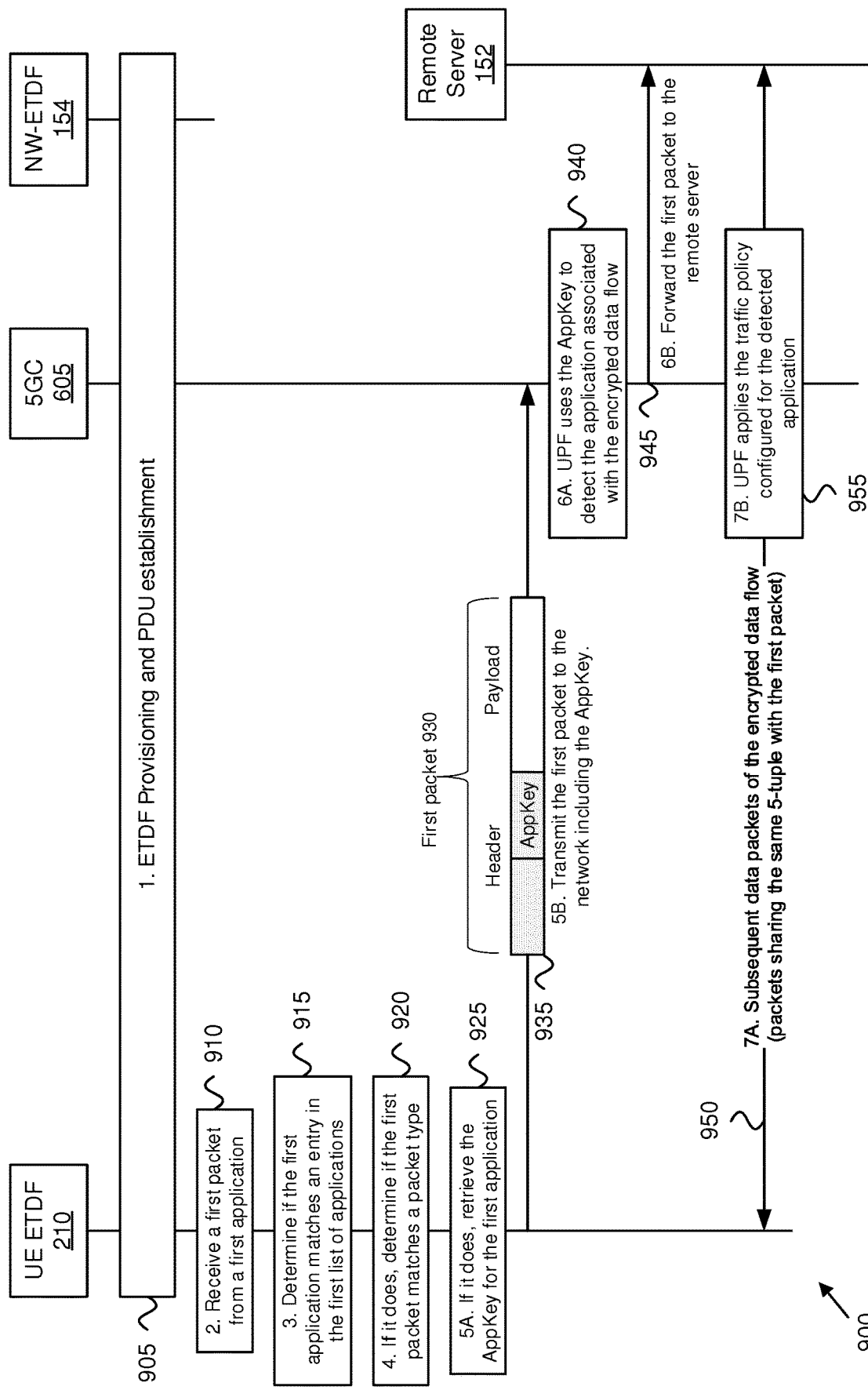
FIG. 9 is a block diagram illustrating one embodiment of a network procedure for encrypted traffic detection.

FIG. 9 depicts a network procedure 900 for encrypted traffic detection, according to embodiments of the disclosure. The network procedure 900 involves the UE-ETDF 210, the 5GC 605, the NW-ETDF 154, and the remote server 152. While depicted as separate from (e.g., external to) the 5GC 605, in other embodiments the procedure is performed with the NW-ETDF 154 being located within the 5GC 605. Note that the UE-ETDF 210 is a part of the UE 205 (not shown).

The network procedure 900 begins in block 905 where the UE is provisioned with a unique instance of a UE-ETDF 210 and the PDU session is established. One example of UE-ETDF provisioning is described above with reference to FIG. 7 and includes the UE downloading an UE-ETDF instance from the NW-ETDF 154. One example of PDU session establishment is described above with reference to FIG. 8. After the UE-ETDF Provisioning and PDU Session establishment is performed (see block 905), the network can reliably determine an application associated with an encrypted data flow by using "encrypted traffic detection information" (e.g., the AppKey) provided by the UE 205.

Following the UE-ETDF provisioning and PDU Session establishment, the UE-ETDF 210 receives a first packet from a first application inside the UE (see block 910). As discussed above with reference to FIG. 2B, one or more hooks in the networking stack the UE 205 may pass the packet to the UE-ETDF 210 for inspection.

Having received a data packet, the UE-ETDF 210 determines if the generating application (here, the first application) matches an entry in the list of applications received during the PDU Session establishment (see block 915). A match would exist (i) if the identity of the first application is included in the list, or (ii) if the identity of the first application is not included in the list, but the list includes a "wildcard" application identity (e.g., "com.3gpp.wildcard").

If the first application matches an entry in the first list of applications, then the UE-ETDF 210 determines if the first packet matches at least one of a plurality of packet types (see block 920). For example, the UE-ETDF 210 may determine if the first packet is a TCP SYN packet to port '443,' or a TLS 'ClientHello' packet, etc. All these packet types are packets that initiate a new encrypted data flow. To detect a new SSL/TLS encrypted data flow, the UE-ETDF 210 may detect when a new TCP connection to port '443' is initiated, i.e., when a TCP SYN packet to destination port '443' is sent. Alternatively, the UE-ETDF 210 may detect when a new TLS 'ClientHello' message is being sent (which is useful in case the TLS connection is not made on the default port '443').

If the first packet matches at least one of the plurality of packet types, the UE-ETDF 210 then identifies that a new encrypted data flow is starting and that the UE-ETDF 210 is to provide detection information for this data flow to the 5GC 605. In the depicted embodiment, the detection information is the AppKey corresponding to the application that initiated the data flow. Hence, the UE-ETDF 210 retrieves the AppKey corresponding to the application that initiated the data flow and embeds this AppKey in the first packet (see block 925 and first packet 930). Subsequently, the UE 205 transmits the first data packet to the network including the AppKey (see messaging 935).

As discussed above, the AppKey may be embedded in an IPv6 header (e.g. by using a new IPv6 Extended Header), or in an IPv4 packet (e.g. by using a new Protocol Type), or in a GRE header, etc. The AppKey is constructed as a small number (e.g. 16 bits) that can be easily embedded into the first data packet.

When the UPF 141 in the 5GC 605 receives the first packet 930, it uses the AppKey to identify the application associated with the new encrypted data flow (see block 940). As discussed above, the UPF 141 receives from the PCF 147 (e.g., via the SMF 143) a list of application ids and their corresponding AppKeys. Finally, the UPF 141 forwards the first packet to its final destination (here, the remote server 152) after removing the AppKey (see messaging 945). If the UPF 141 is provisioned with traffic policy for the detected application, the UPF 141 applies this policy for all the packets of the encrypted data flow (see messaging 950 and block 955). These packets share the same value of 5-tuple (source/destination address, source/destination port, protocol).

Figure 10:
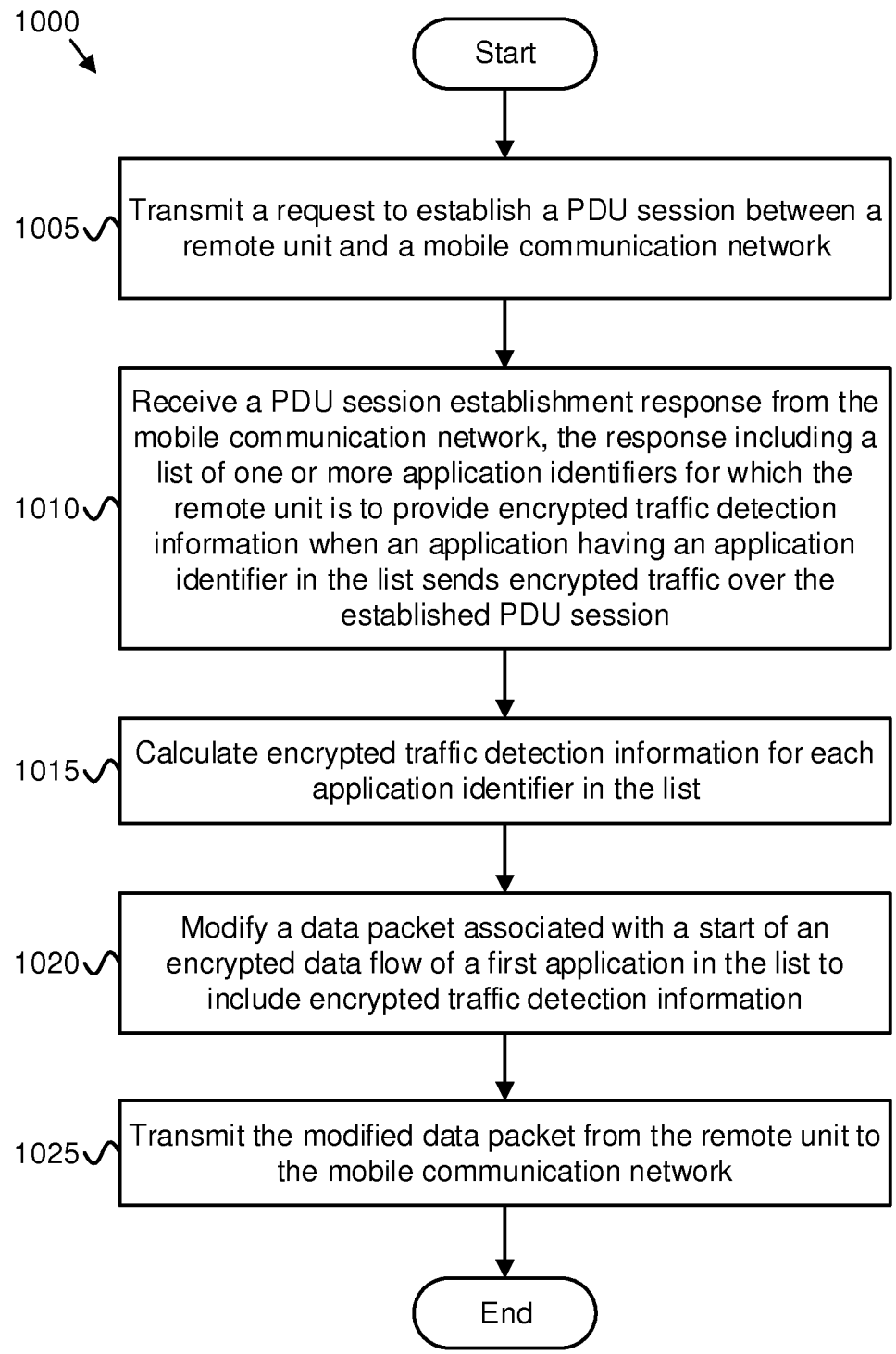
FIG. 10 is a flow chart diagram illustrating one embodiment of a method of a user equipment for PDU Session Establishment for encrypted traffic detection.

FIG. 10 depicts a method 1000 for PDU Session Establishment for encrypted traffic detection, according to embodiments of the disclosure. In some embodiments, the method 1000 is performed by an apparatus, such as the remote unit 105, the UE 205, and/or the user equipment apparatus 300. In certain embodiments, the method 1000 may be performed by a processor executing program code, for example, a microcontroller, a microprocessor, a CPU, a GPU, an auxiliary processing unit, a FPGA, or the like.

The method 1000 begins with transmitting 1005 a request to establish a PDU session between a remote unit and a mobile communication network. In certain embodiments, the request to establish a PDU session includes data indicating the remote unit is able to provide encrypted traffic detection information. In other embodiments, data indicating the remote unit is able to provide encrypted traffic detection information was included in a registration request previously sent to the mobile communication network. In various embodiment, the data indicating the remote unit is able to provide encrypted traffic detection information comprises a device identifier of the remote unit and an operating system identifier of an operating system running on the remote unit.

The method 1000 includes receiving 1010 a PDU session establishment response from the mobile communication network, wherein the response includes a list of one or more application identifiers for which the remote unit is to provide encrypted traffic detection information when an application having an application identifier in the list sends encrypted traffic over the established PDU session. In certain embodiments, the PDU session establishment response includes a randomly-generated value.

The method 1000 includes calculating 1015 encrypted traffic detection information for each application identifier in the list. In some embodiments, calculating 1015 the encrypted traffic detection information comprises the generating a signature of a UE-ETDF on the remote unit. In various embodiments, the encrypted traffic detection information is an application key. In some embodiments, calculating 1015 the encrypted traffic detection information for each application identifier in the list includes generating an application key for each application identifier in the list using the signature and the application identifier. Where the PDU session establishment response includes the randomly-generated value, the application key may be generated using the signature, the randomly-generated value, and the application identifier.

The method 1000 includes modifying 1020 a data packet associated with a start of an encrypted data flow of a first application in the list to include encrypted traffic detection information. The method 1000 includes transmitting 1025 the modified data packet from the remote unit to the mobile communication network. The method 1000 ends. In various embodiments, the data packet associated with a start of an encrypted data flow of a first application in the list is one of: a Transmission Control Protocol Synchronize ("TCP SYN") packet with destination port '443,' a Transport Layer Security protocol ("TLS") 'ClientHello' packet, and a User Datagram Protocol ("UDP") packet to port '80.'

Figure 11:
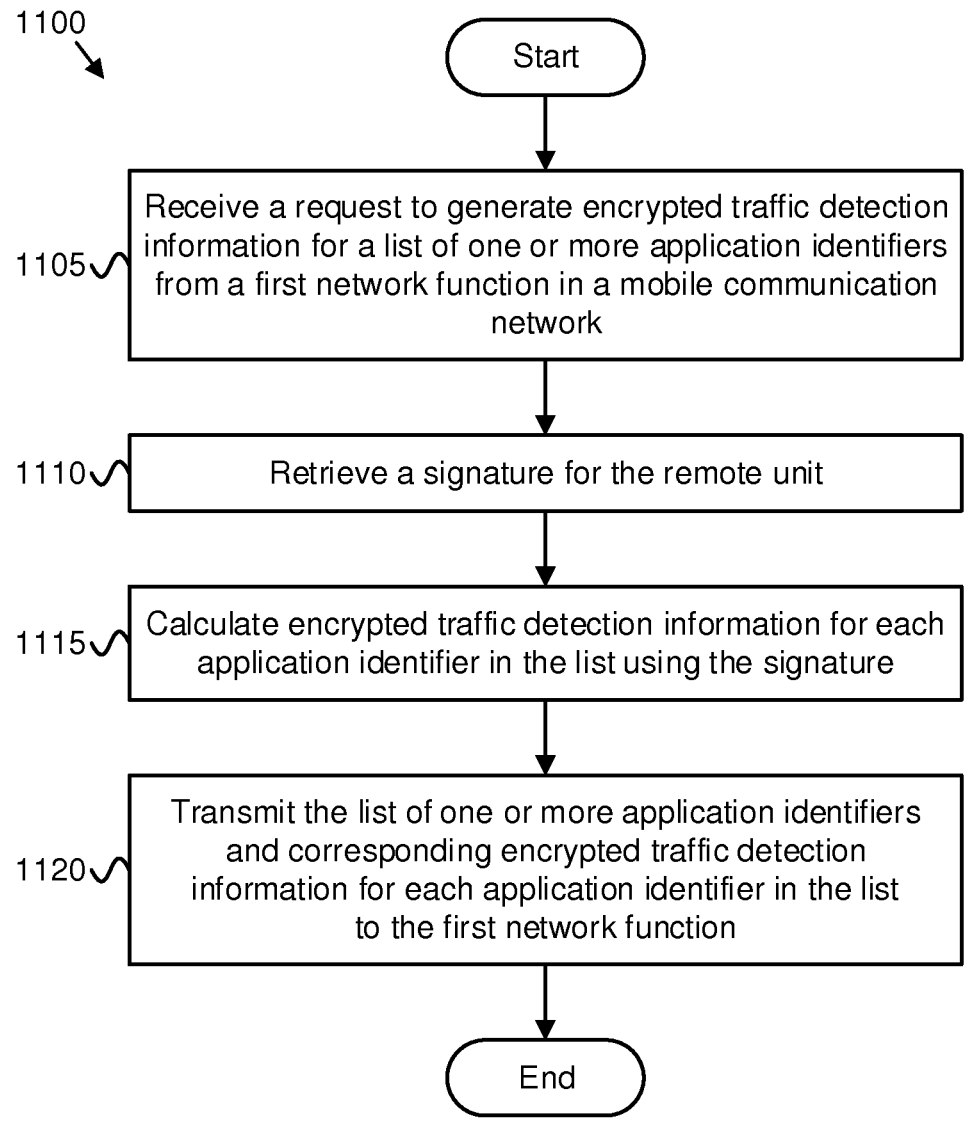
FIG. 11 is a flow chart diagram illustrating one embodiment of a method of network encrypted traffic detection function for PDU Session Establishment for encrypted traffic detection.

FIG. 11 depicts a method 1100 for PDU Session Establishment for encrypted traffic detection, according to embodiments of the disclosure. In some embodiments, the method 1100 is performed by an apparatus, such as the NW-ETDF 154 and/or the encrypted traffic detection apparatus 400. In certain embodiments, the method 1100 may be performed by a processor executing program code, for example, a microcontroller, a microprocessor, a CPU, a GPU, an auxiliary processing unit, a FPGA, or the like.

The method 1100 begins with receiving 1105 a request to generate encrypted traffic detection information for a list of one or more application identifiers. Here, the request may be sent by a PCF 147 in response to a remote unit 105 requesting to establish a PDU session with the mobile communication network. In various embodiments, the request to generate encrypted traffic detection information may include a device identifier of the remote unit 105

The method 1100 includes retrieving 1110 a signature for the remote unit 105. In certain embodiments, a request from the remote unit 105 to download a UE-ETDF 156 is received prior to receiving 1105 the request to generate encrypted traffic detection information. In such embodiments, the signature for the remote unit 105 is a signature of the UE-ETDF 156 downloaded to the remote unit 105. In certain embodiments, retrieving 1110 a signature for the remote unit 105 comprises looking up a stored signature using the device identifier for the remote unit 105.

The method 1100 includes calculating 1115 encrypted traffic detection information for each application identifier in the list using the signature. In various embodiments, the encrypted traffic detection information is an application key. In such embodiments, calculating 1115 the encrypted traffic detection information for each application identifier in the list includes generating an application key for each application identifier in the list using the UE-ETDF signature and the application identifier.

The method 1100 includes transmitting 1120 the list of one or more application identifiers and corresponding encrypted traffic detection information for each application identifier in the list to the first network function. The method 1100 ends.

Figure 12:
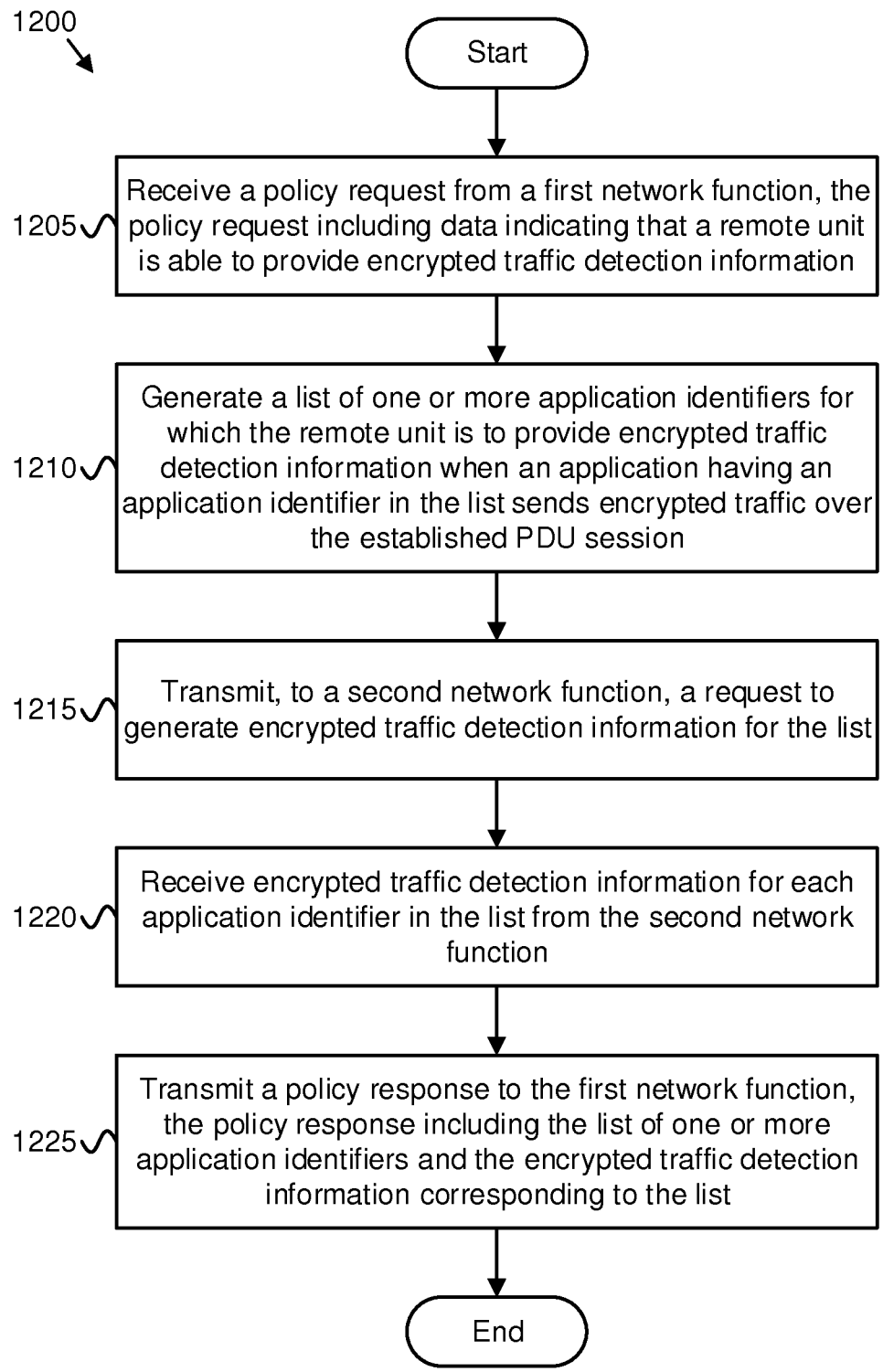
FIG. 12 is a flow chart diagram illustrating one embodiment of a method of a network function for PDU Session Establishment for encrypted traffic detection.

FIG. 12 depicts a method 1200 for PDU Session Establishment for encrypted traffic detection, according to embodiments of the disclosure. In some embodiments, the method 1200 is performed by an apparatus, such as the UPF 141 and/or the network function apparatus 500. In certain embodiments, the method 1200 may be performed by a processor executing program code, for example, a microcontroller, a microprocessor, a CPU, a GPU, an auxiliary processing unit, a FPGA, or the like.

The method 1200 begins with receiving 1205 a policy request from a first network function, the policy request including data indicating that a remote unit is able to provide encrypted traffic detection information. In various embodiments, the policy request is sent in response to the remote unit requesting to establish a PDU session with the mobile communication network.

The method 1200 includes generating 1210 a list of one or more application identifiers for which the remote unit is to provide encrypted traffic detection information when an application having an application identifier in the list sends encrypted traffic over the established PDU session. The method 1200 includes transmitting 1215 a request to generate encrypted traffic detection information for a list of one or more application identifiers to a second network function. In certain embodiments, transmitting 1215 the request to generate encrypted traffic detection information includes generating a random value, wherein the request includes the random value. In such embodiments, the random value is used to derive encrypted traffic detection information, such as an application key.

The method 1200 includes receiving 1220 encrypted traffic detection information for each application identifier in the list from the second network function. The method 1200 includes transmitting 1225 a policy response to the first network function. Here, the policy response includes the list of one or more application identifiers and the encrypted traffic detection information corresponding to the list. The method 1200 ends. In some embodiments, the data indicating the remote unit is able to provide encrypted traffic detection information includes a device identifier of the remote unit and an operating system identifier of an operating system running on the remote unit, wherein the request to generate encrypted traffic detection information includes the device identifier of the remote unit.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
    a transceiver that communicates with a mobile communication network; and
    a processor that:
    transmits a request to establish a Packet Data Unit ("PDU") session with the mobile communication network;
    receives a PDU session establishment response from the mobile communication network, wherein the PDU session establishment response includes a list of one or more application identifiers for which the apparatus is to provide encrypted traffic detection information when an application having an application identifier in the list of one or more application identifiers sends encrypted traffic over the established PDU session;
    calculates encrypted traffic detection information for each application identifier in the list of one or more application identifiers; and
    modifies a data packet associated with a start of an encrypted data flow of a first application in the list of one or more application identifiers to include encrypted traffic detection information,
    wherein the transceiver sends the modified data packet to the mobile communication network.

2. The apparatus of claim 1, wherein the request to establish a PDU session comprises data indicating the apparatus is able to provide encrypted traffic detection information.

3. The apparatus of claim 1, wherein the processor registers with the mobile communication network prior to transmitting the request to establish a PDU session, wherein registering with the mobile communication network includes transmitting data indicating the apparatus is able to provide encrypted traffic detection information.

4. The apparatus of claim 3, wherein the data indicating the apparatus is able to provide encrypted traffic detection information comprises a device identifier of the apparatus and an operating system identifier of an operating system running on the processor.

5. The apparatus of claim 1, further comprising a user equipment ("UE") encrypted traffic detection function ("ETDF"), wherein calculating the encrypted traffic detection information comprises the processor generating a signature of the UE ETDF.

6. The apparatus of claim 5, wherein the encrypted traffic detection information comprises an application key, wherein calculating encrypted traffic detection information for each application identifier in the list of one or more application identifiers comprises generating an application key for each application identifier in the list of one or more application identifiers using the signature and the application identifier.

7. The apparatus of claim 5, wherein the encrypted traffic detection information comprises an application key, wherein the PDU session establishment response includes a randomly-generated value, wherein calculating encrypted traffic detection information for each application identifier in the list of one or more application identifiers comprises generating an application key for each application identifier in the list of one or more application identifiers using the signature, the randomly-generated value, and the application identifier.

8. The apparatus of claim 5, wherein the processor downloads the UE ETDF from a network ETDF in the mobile communication network prior to transmitting the request to establish a PDU session, wherein the UE ETDF is one of a plurality of ETDF instances downloaded from the network ETDF, wherein the UE ETDF has a signature that is different from the signature of all other ETDFs downloaded from the network ETDF.

9. The apparatus of claim 1, wherein the data packet associated with a start of an encrypted data flow of a first application in the list of one or more application identifiers comprises one of: a Transmission Control Protocol Synchronize ("TCP SYN") packet with destination port '443,' a Transport Layer Security protocol ("TLS") 'ClientHello' packet, and a User Datagram Protocol ("UDP") packet to port '80'.

10. A method comprising:
transmitting a request to establish a Packet Data Unit ("PDU") session between a remote unit and a mobile communication network;
receiving a PDU session establishment response from the mobile communication network, wherein the PDU session establishment response includes a list of one or more application identifiers for which the remote unit is to provide encrypted traffic detection information when an application having an application identifier in the list of one or more application identifiers sends encrypted traffic over the established PDU session;
calculating encrypted traffic detection information for each application identifier in the list of one or more application identifiers;
modifying a data packet associated with a start of an encrypted data flow of a first application in the list of one or more application identifiers to include encrypted traffic detection information; and
transmitting the modified data packet from the remote unit to the mobile communication network.

11. The method of claim 10, wherein the request to establish a PDU session comprises data indicating the remote unit is able to provide encrypted traffic detection information.

12. The method of claim 10, further comprising the remote unit registering with the mobile communication network prior to transmitting the request to establish a PDU session, wherein registering with the mobile communication network includes transmitting data indicating the remote unit is able to provide encrypted traffic detection information.

13. The method of claim 12, wherein the data indicating the remote unit is able to provide encrypted traffic detection information comprises a device identifier of the remote unit and an operating system identifier of an operating system running on the remote unit.

14. The method of claim 10, wherein calculating the encrypted traffic detection information comprises generating a signature of a user equipment ("UE") encrypted traffic detection function ("ETDF") on the remote unit.

15. The method of claim 14, wherein the encrypted traffic detection information comprises an application key, wherein calculating encrypted traffic detection information for each application identifier in the list of one or more application identifiers comprises generating an application key for each application identifier in the list of one or more application identifiers using the signature and the application identifier.

16. The method of claim 14, wherein the encrypted traffic detection information comprises an application key, wherein the PDU session establishment response includes a randomly-generated value, wherein calculating encrypted traffic detection information for each application identifier in the list of one or more application identifiers comprises generating an application key for each application identifier in the list of one or more application identifiers using the signature, the randomly-generated value, and the application identifier.

17. The method of claim 14, further comprising the remote unit downloading the UE ETDF from a network ETDF in the mobile communication network prior to transmitting the request to establish a PDU session, wherein the UE ETDF is one of a plurality of ETDF instances downloaded from the network ETDF, wherein the UE ETDF has a signature that is different from the signature of all other ETDFs downloaded from the network ETDF.

18. The method of claim 10, wherein the data packet associated with a start of an encrypted data flow of a first application in the list of one or more application identifiers comprises one of: a Transmission Control Protocol Synchronize ("TCP SYN") packet with destination port '443,' a Transport Layer Security protocol ("TLS") 'ClientHello' packet, and a User Datagram Protocol ("UDP") packet to port '80'.

19. The apparatus of claim 2, wherein the data indicating the apparatus is able to provide encrypted traffic detection information comprises a device identifier of the apparatus and an operating system identifier of an operating system running on the processor.

20. The method of claim 11, wherein the data indicating the remote unit is able to provide encrypted traffic detection information comprises a device identifier of the remote unit and an operating system identifier of an operating system running on the remote unit.

* * * * *